US012525182B2

(12) United States Patent
Cho et al.

(10) Patent No.: US 12,525,182 B2
(45) Date of Patent: Jan. 13, 2026

(54) DISPLAY DEVICE HAVING IMAGE SENSING PIXELS FOR SENSING USER'S GAZE AND SYSTEM THEREOF

(71) Applicant: SAMSUNG ELECTRONICS CO., LTD., Suwon-si (KR)

(72) Inventors: Hwa Hyun Cho, Suwon-si (KR); Yoonho Ko, Suwon-si (KR); Hyunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/642,923

(22) Filed: Apr. 23, 2024

(65) Prior Publication Data

US 2025/0022414 A1 Jan. 16, 2025

(30) Foreign Application Priority Data

Jul. 12, 2023 (KR) ........................ 10-2023-0090479

(51) Int. Cl.
*G09G 3/3225* (2016.01)
*G09G 3/00* (2006.01)
*G09G 3/32* (2016.01)

(52) U.S. Cl.
CPC ........... *G09G 3/3225* (2013.01); *G09G 3/002* (2013.01); *G09G 3/32* (2013.01); *G09G 2310/027* (2013.01)

(58) Field of Classification Search
CPC .................................................... G09G 3/3225
USPC ............................................................ 345/55
See application file for complete search history.

(56) References Cited

U.S. PATENT DOCUMENTS

| | | | |
|---|---|---|---|
| 9,484,381 B2 | 11/2016 | Kurokawa et al. | |
| 9,749,562 B2 | 8/2017 | Goto et al. | |
| 9,846,304 B2 | 12/2017 | Sako et al. | |
| 2011/0018850 A1 | 1/2011 | Uehata et al. | |
| 2011/0205250 A1* | 8/2011 | Yoo | G09G 3/3233 345/77 |
| 2013/0241907 A1* | 9/2013 | Amirparviz | G02B 27/0093 345/207 |
| 2017/0142360 A1* | 5/2017 | Goto | H01L 27/14636 |
| 2018/0226595 A1 | 8/2018 | Liu | |
| 2022/0293682 A1 | 9/2022 | Einzinger et al. | |
| 2023/0109051 A1 | 4/2023 | Jeon et al. | |

* cited by examiner

*Primary Examiner* — Long D Pham
(74) *Attorney, Agent, or Firm* — Fish & Richardson P.C.

(57) ABSTRACT

A display device according to an embodiment may include: a plurality of first display pixels disposed in a first region of a substrate; a plurality of image sensing pixels that are disposed in a second region positioned at the periphery of the first region of the substrate, and generate pixel signals; and a driving circuit that is disposed on the substrate, generates a plurality of first data signals based on input image data, provides the plurality of first data signals to the plurality of first display pixels, receives the pixel signal from the plurality of image sensing pixels, and generates image data corresponding to the user's gaze based on the pixel signal.

19 Claims, 16 Drawing Sheets

200

DISPLAY DEVICE HAVING IMAGE SENSING PIXELS FOR SENSING USER'S GAZE AND SYSTEM THEREOF

CROSS-REFERENCE TO RELATED APPLICATION

This application claims priority to and the benefit of Korean Patent Application No. 10-2023-0090479 filed in the Korean Intellectual Property Office on Jul. 12, 2023, the entire contents of which are incorporated herein by reference.

BACKGROUND

The present disclosure relates to a display device and a system.

Near to eye (NTE) display devices are used to provide virtual reality (VR) and augmented reality (AR). The near-eye display device is mounted on a wearable device and provides an enlarged image to a user through an optical system, and thus the device is equipped with a micro display that can display a high-resolution image despite being small in size. In general, a display includes a plurality of display pixels to provide various visual information to the user, and each plurality of display pixels emits light of a certain luminance to display an image.

Meanwhile, the wearable device may interact with users by tracking the user's gaze as they gaze at the display screen using a separate camera device. For example, an infrared ray (IR) light source is used to track the user's gaze, and this light may be reflected from the user's eyes and transmitted to the camera. However, as the size of the display becomes smaller, the need to improve the form factor for wearable devices and reduce manufacturing costs while maintaining resolution increases.

SUMMARY

The present disclosure is directed to a display device and a system that disposes a display pixel in a foveated area and disposes an image sensing pixel in a peripheral area.

In some implementations, the display device and the system improve a form factor of a wearable device and reduce a manufacturing cost while maintaining resolution.

In general, aspects of the subject matter described in this specification can be embodied in a display device including: a plurality of first display pixels disposed in a first region of a substrate; a plurality of image sensing pixels that are disposed in a second region positioned at the periphery of the first region of the substrate, and generate pixel signals; and a driving circuit that is disposed on the substrate, configured to generate a plurality of first data signals based on input image data, provide the plurality of first data signals to the plurality of first display pixels, receive the pixel signal from the plurality of image sensing pixels, and generate image data corresponding to the user's gaze based on the pixel signal.

Another general aspect can be embodied in a display panel including: a plurality of display pixels disposed with first resolution in a first region, disposed with second resolution that is lower than the first resolution in a second region surrounding the first resolution, and emitting light during a first period; a light emitting pixel that is disposed in the second region and emits light during a second period, which is different from the first period; and a plurality of image sensing pixels disposed in the second region and emitting a pixel signal by light emitted from the light emitting pixel and reflected by a user.

Another general aspect can be embodied in a display system including: a pixel array that includes a plurality of display pixels emitting light of an image and a plurality of image sensing pixels that are disposed only in a second region at the periphery of a first region in which a user's gaze settles for sensing light reflected to user's eyes; a driving circuit that provides a plurality of data signals to a plurality of source lines connected to the plurality of display pixels based on input image data and generates eye tracking data corresponding to the user's eye by receiving a pixel signal from a plurality of column lines connected to the plurality of image sensing pixels; and a host device that provides the image data, receives the eye tracking data, and processes the image data based on the eye tracking data.

DETAILED DESCRIPTION

Figure 1:
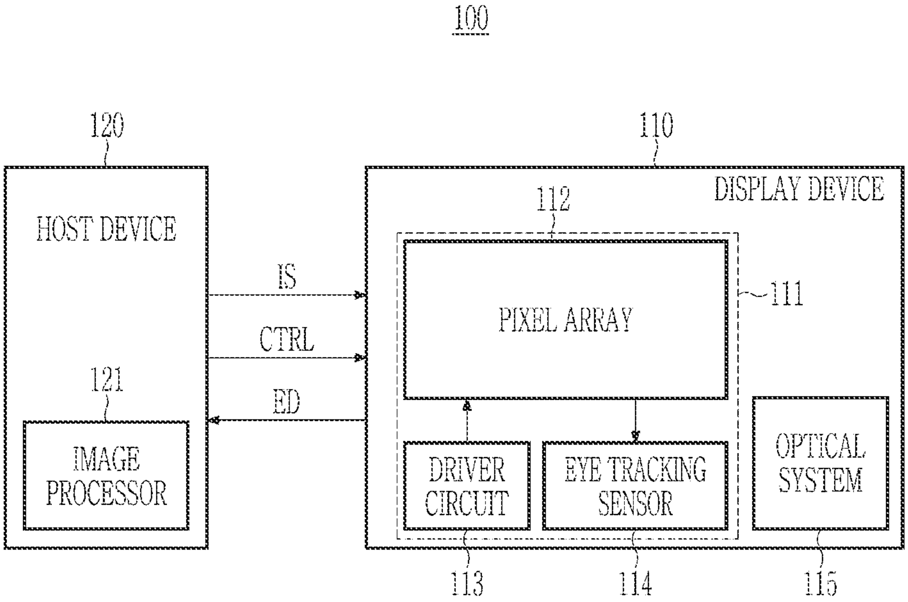
FIG. 1 is a block diagram of an example of a display system.

The following examples may be modified in various different ways, all without departing from the spirit or scope of the present disclosure.

Accordingly, the drawings and description are to be regarded as illustrative in nature and not restrictive. Like reference numerals designate like elements throughout the specification. In the flowchart described with reference to the drawing, the order of operations may be changed, several operations may be merged, certain operations may be divided, and certain operations may not be performed.

In the present specification, expressions described in the singular may be construed in the singular or plural unless an explicit expression such as "one" or "single" is used. In the present specification, the terms including ordinal numbers such as first, second, etc. may be used to describe various elements, but the elements are not limited by the terms. The terms are used only for the purpose of distinguishing one element from another element.

FIG. 1 is an example of an block diagram of a display system 100.

The display system 100 may provide an artificial reality system, for example, a VR system, an AR system, a mixed reality (MR) system, a hybrid reality system, or some combination thereof and/or a derived system. The artificial reality system may be implemented in various platforms including a head-mounted display (HMD), a mobile device, a computing system, or other hardware platform that can provide artificial reality contents to one or more viewers. The display system 100 includes a display device 110 and a host device 120.

The display device 110 may receive image data transmitted from the host device 120 and display an image according to the image data IS. The image data IS may include first image data rendered at first resolution and second image data rendered at second resolution that is lower than the first resolution. The display device 110 may display a two-dimensional or three-dimensional image to the user. The display device 110 may include a display panel 111 and an optical system 115. In some implementations, the display device 110 may further include a power supply circuit providing a driving voltage to the display panel 111 and the optical system 1115, such as a DC/DC converter.

In some implementations, the display panel 111 may display an image to a user according to the image data IS received from the host device 120. In various examples, the display panel 111 may be one or plural. For example, two display panels 111 each may provide an image for each eye of the user. The display panel 111 may be a liquid crystal display (LCD), an organic light emitting diode (OLED) display, an inorganic light emitting diode (ILED) display, a micro light emitting diode (μLED) display, an active matrix OLED display (AMOLED), a transparent (TOLED), and the like.

In some implementations, the display panel 111 may include a pixel array 112, a driving circuit 113, and an eye tracking sensor 114. The display panel 111 may have a backplane structure in which the pixel array 112, the driving circuit 113, and the eye tracking sensor 114 are disposed on a silicon substrate (e.g., silicon semiconductor substrate). For example, the display panel 111 may include the pixel array 112, the driving circuit 113, and the eye tracking sensor 114 on a complementary metal-oxide-semiconductor (CMOS) wafer.

In some implementations, the pixel array 112 may include a plurality of display pixels, and a plurality of gate lines and a plurality of source lines that are respectively connected to the plurality of display pixels. In some implementations, the pixel array 112 may further include a plurality of image sensing pixels, and a plurality of row lines and a plurality of column lines that are respectively connected to the plurality of image sensing pixels. In some implementations, the plurality of display pixels and the plurality of image sensing pixels are connected to the same gate line. The plurality of display pixels may emit light predominantly in, colors such as red, green, blue, white, or yellow. The plurality of image sensing pixels may generate image signals corresponding to the position and motion of the user's eyes (or pupils).

In some implementations, the pixel array 112 includes a region of interest where the user's gaze settles or is fixed. A size of the interest region may be based on a circular arc/angle covered by the user's gaze. For example, the circular may be covered by the user's gaze may be 20 degrees, or may be a circular arc/angle of 5 degrees to 20 degrees. A plurality of display pixels may be disposed in the interest region of pixel array 112. The plurality of display pixels disposed in the interest region of pixel array 112 may display images rendered with first resolution. The pixel array 112 may include a peripheral area around the interest region. A plurality of image sensing pixels may be disposed in the peripheral area. The plurality of image sensing pixels disposed in the peripheral area may output an image signal corresponding to the user's eye. A plurality of display pixels may further be disposed in the peripheral area. The plurality of display pixels disposed in the peripheral area of the pixel array 112 may display an image rendered with second resolution, which is lower than the first resolution.

The driving circuit 113 may generate a signal driving the pixel array 112 based on the image data IS received from the host device 120. The signal driving the pixel array 112 may be transmitted to the plurality of display pixels through a plurality of gate lines and a plurality of source lines. In some implementations, the driving circuit 113 may generate gate signals and data signals driving the plurality of display panels included in the pixel array 112 and may provide the gate signals and the data signals to the plurality of display pixels. The plurality of pixels included in the pixel array 112 may emit light of an image in response to a signal provided by the driving circuit 113. In some implementations, the driving circuit 113 may generate driving signals driving the plurality of image sensing pixels included in the pixel array 112 and provide row signals to the plurality of image sensing pixel. The plurality of image sensing pixels included in the pixel array 112 may generate image signals corresponding to the position and motion of the user's eyes by signals provided by the driving circuit 113. In some implementations, the driving circuit 113 may provide the same gate signals to the plurality of display pixels and the plurality of image sensing pixels.

The eye tracking sensor 114 may track the position and motion of the user's eye. Eye tracking may refer to determining the position of the eye, including the orientation and position of the eye relative to the display device 110. In some implementations, the eye tracking sensor 114 may include an imaging system for imaging one or more eyes. The eye tracking sensor 114 receives an image signal from the plurality of sensing pixels included in the pixel array 112 and may convert the image signal to a pixel value indicating the amount of light. The eye tracking sensor 114 may generate image data corresponding to the position and motion of the user's eyes from the pixel value. The eye tracking sensor 114 generates eye tracking data ED from the image data and transmit the eye tracking data ED to the host device 120.

The image displayed on the pixel array 112 may be viewed by the user's eyes through the optical system 115. In some implementations, the optical system 115 optically displays image content or magnifies image light received from the pixel array 112 and corrects optical errors associated with image light and provides corrected image light to the user. For example, the optical system 115 may include a substrate, an optical waveguide, aperture, a Fresnel lens, a convex lens, a concave lens, a filter, an input/output coupler, or any other suitable optical elements that may affect the image light emitted from the pixel array 112. In some implementations, the image sensing pixel positioned in the pixel array 112 may detect light incident on the user's eyes through an optical element in the optical system 115 and convert the incident light into an electric signal according to the amount of light. In some implementations, the display pixels and image sensing pixels of the pixel array 112 may use the same optical elements. Therefore, a separate optical element for the image sensing pixels may be unnecessary.

The host device 120 may be a computing device or system that externally controls the display device 110 to display a user's desired image on the pixel array 112. The host device 120 may transmit the image data IS according to content to be presented to the user to the display device 110.

The host device 120 may transmit a driving control signal CTRL to the display device 110. The driving control signal CTRL may include control commands, setting data, and the like for controlling the driving circuit 113, the eye tracking sensor 114, and the optical system 115.

The host device 120 may include an image processor 121 that generates the image data IS. In some implementations, the image processor 121 may process the image data IS based on the eye tracking data ED received from the display device 110. The image processor 121 receives the eye tracking data ED from the eye tracking sensor 114 and determines the position of the user's eye based on the eye tracking data ED. The image processor 121 may perform image rendering that reduces resolution in the peripheral area while maintaining higher resolution in a foveated region based on eye tracking data ED.

Figure 2:
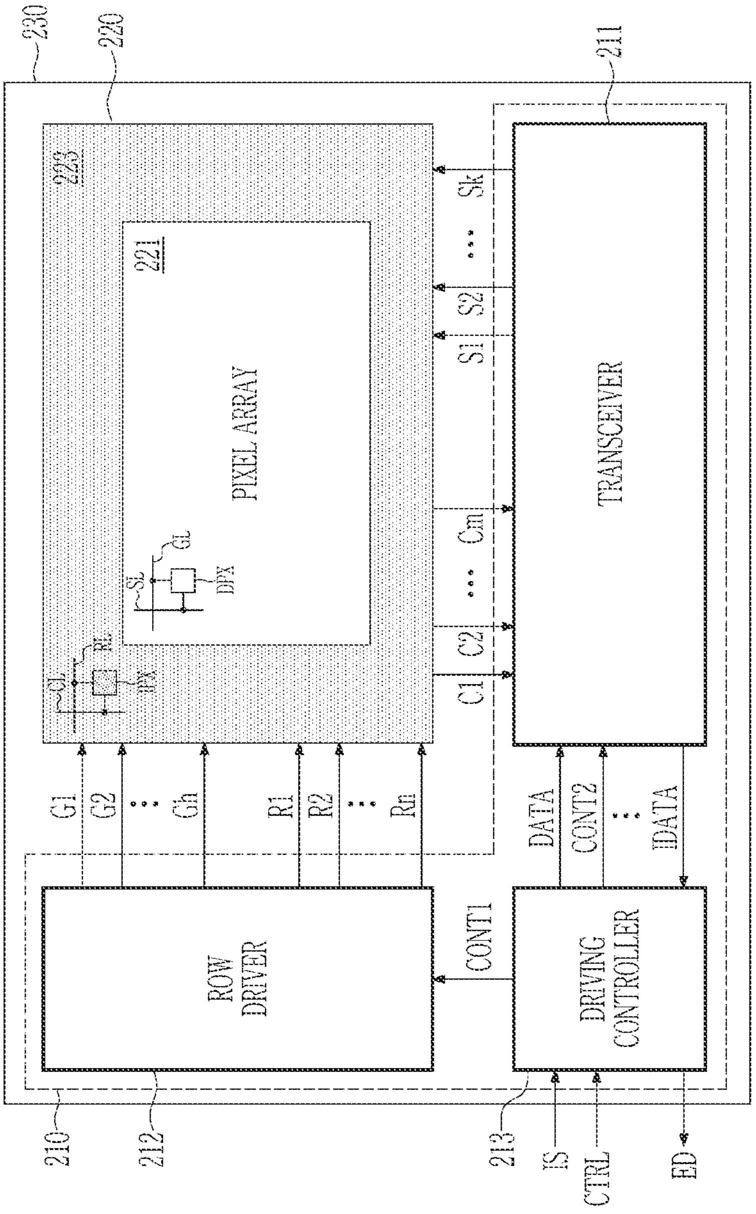
FIG. 2 is a block diagram of an example of a display device.

FIG. 2 is a block diagram of an example a display device 200.

Referring to FIG. 2, the display device 200 includes a driving circuit 210 and a pixel array 220. In some implementations, the eye tracking sensor (114 of FIG. 1) may be included in the pixel array 220 and the driving circuit 210.

The pixel array 220 may include a first region 221 and a second region at the periphery of the first region 221. The second region 223 may be a region surrounding the first region 221. The first region 221 may generally be referred to as an interest region where the user's gaze settles or is fixed. A plurality of display pixels DPX for displaying an image may be disposed in at least the first region 221 of the pixel array 220. In at least the first region 221 of the pixel array 220, the plurality of display pixels DPX may be disposed to display images rendered with first resolution. The plurality of display pixels DPX may be connected to a corresponding source line SL among a plurality of source lines and a corresponding gate line GL among a plurality of gate lines. The plurality of display pixels DPX may receive data signals S1 to Sk from the source line SL when gate signals G1 to Gn are supplied from the gate line GL. The plurality of display pixels DPX may represent light of predetermined luminance corresponding to an input data signal. The plurality of display pixels DPX may display an image with one frame unit.

In some implementations, each display pixel DPX may include a pixel driving circuit including a driving transistor and an organic light emitting diode (OLED). The driving transistor included in the display pixel DPX supplies a current corresponding to a data signal to the OLED, and accordingly, the OLED may emit light with predetermined luminance. In some implementations, each display pixel DPX may include a pixel driving circuit including a driving transistor and a micro-LED.

In FIG. 2, it is illustrated that the display pixel DPX is connected to one source line SL and one gate line GL, but the connection structure of the signal line of the display pixel DPX of the display device is not limited thereto. For example, various signal lines may be additionally connected in response to the circuit structure of the display pixel DPX.

A plurality of image sensing pixels IPX may be disposed in the second region 223 of the pixel array 220. The second region 223 may be called a peripheral area. The plurality of image sensing pixels IPX may generate image signals corresponding to the position and motion of the eye (or pupil) of the user. In some implementations, each image sensing pixel IPX may include a pixel driving circuit including a driving transistor and a photoelectric conversion element. The photoelectric conversion element may detect light incident on the user's eyes and convert the incident light into an electric signal, that is, a plurality of analog pixel signals according to the amount of light. The plurality of image sensing pixels IPX may be connected to a corresponding row line RL among the plurality of row lines and a corresponding column line CL among the plurality of column lines. The plurality of image sensing pixels IPX may receive driving signals R1 to Rn from the row line RL and output pixel signals Cl to Cm through the column line CL. The plurality of display pixels DPX may further be disposed in the second region 223 of the pixel array 220. A plurality of display pixels DPX for displaying an image rendered with second resolution, which is lower than first resolution, may be disposed in the second region 223 of the pixel array 220.

In some implementations, the driving transistor of the display pixel DPX and the driving transistor of the image sensing pixel IPX may be an N-type transistor or a P-type transistor. In some implementations, the driving transistors of the display pixel DPX and the image sensing pixel IPX may be different types of transistors. In some implementations, the driving transistors of the display pixel DPX and the image sensing pixel IPX may be the same type of transistor.

The display device 200 may further include a light emitter that generates light directed to the user's eyes such that the light reflected by the user's eyes can be sensed by the plurality of image sensing pixels IPX. For example, the light emitter may include light-emitting pixels that emit light in an infrared region and/or visible ray region. In some implementations, the light-mitting emitting pixel may be disposed in the substrate 230 of the display device 200. For example, the light-emitting pixel may be disposed in the first region 221 and/or second region of the pixel array 220.

The driving circuit 210 may include a row driver 212, a transceiver 211, and a driving controller 213.

The row driver 212 may provide a plurality of gate signals G1 to Gh. The plurality of gate signals G1 to Gh may have an enable level and a disable level. The plurality of gate signals G1 to Gh may be applied to the plurality of gate lines GL. When a gate signal of an enable level is applied to the gate line GL connected to the display pixel DPX, a data signal applied to a source line SL connected to the display pixel DPX may be transmitted to the display pixel DPX. The row driver 212 may provide the plurality of gate signals G1 to Gh during a plurality of horizontal periods. One frame may include a plurality of horizontal periods.

The row driver 212 may provide a plurality of driving signals R1 to Rn. The row driver 212 may decode a row driver control signal CONT1 (e.g., address signal) generated from the driving controller 213 and may select at least one row line among the row lines R1 to Rn connected to the image sensing pixels IPX responding to the decoded row driver control signal CONT1. For example, the row driver 212 may generate a driving signal. A pixel signal from the image sensing pixels IPX connected to the low line selected by the driving signal provided from the row driver 212 may by output to the column lines CL. In some implementations, the row driver 212 may selectively apply the driving signal to some of the plurality of row lines RL. For example, the row driver 212 may apply the driving signal to every other row line among the plurality of row lines, e.g., even-numbered row lines among the plurality of row lines. In addition, the row driver 212 may apply the driving signal to odd-numbered row lines among the plurality of row lines.

The transceiver 211 may receive data DATA in the form of a digital signal from the driving controller 213 and may convert the data DATA to data signals S1 to Sk in the form of an analog signal. Here, the data DATA may include gray information corresponding to each display pixel DPX for displaying the image data IS on the pixel array 220. The image data IS may include first image data rendered with first resolution and second image data rendered with second resolution, which is lower than the first resolution. The driving controller 213 may generate data from image data rendered with different resolution, and the transceiver 211 may generate a data signal from the data provided from the driving controller 213. The transceiver 211 may transmit the plurality of data signals S1 to Sk to the pixel array 220 according to a source driver control signal CONT2 provided from the driving controller 213. In some implementations, the transceiver 211 may provide a first data signal generated based on the first image data rendered with the first resolution to the display pixel DPX disposed in the first region of the pixel array 220. The transceiver 211 may provide a second data signal generated based on the second image data rendered with the second resolution, which is lower than the first resolution, to the display pixel DPX disposed in the second region of the pixel array 220. Transceiver 211 may operate as a source driver or a data driver. In some implementations, the transceiver 211 may receive pixel signals C1 to Cm from the plurality of image sensing pixels IPX according to the source driver control signal CONT2 provided from the driving controller 213. Here, the pixel signal may be an image signal corresponding to the user's eyes detected by the plurality of image sensing pixels IPX to track the position and motion of the user's eyes. In some implementations, the transceiver 211 may receive the pixel signal from the plurality of image sensing pixels IPX connected with the row line RL driven by the driving signal. In some implementations, the transceiver 211 may receive the pixel signal from some of the plurality of image sensing pixels IPX connected with the row line RL driven by the driving signal. For example, the transceiver 211 may receive the pixel signal from even-numbered column lines among the plurality of column lines. Alternatively, the transceiver 211 may receive the pixel signal from odd-numbered column lines from the plurality of column lines. In some implementations, the transceiver 211 may receive the pixel signal from some of the plurality of image sensing pixels IPX disposed in the second region of the pixel array 220. The transceiver 211 may convert the pixel signal (or electrical signal) received from the image sensing pixel IPX to a pixel value that indicates a light amount. The transceiver 211 processes the pixel signal output through the column line CL and outputs image data IDATA. The transceiver 211 may operate as a receiver.

In some implementations, the transceiver 211 may operate as a source driver or receiver by dividing time over which the transceiver 211 operates in each configuration. In other words, the transceiver 211 may operate as a source driver within a first time period and as a receiver within a second time period other than the first time period. For example, the transceiver 211 may operate as a receiver during some periods of a vertical blank period VBLANK within one frame and may operate as a source driver during a period other than some periods within one frame. The transceiver 211 may operate as a receiver during some periods of a horizontal blank period HBLANK within one horizontal period and may operate as a source driver during periods other than some periods within one horizontal period.

When the transceiver 211 operates as a source driver, the transceiver 211 may be electrically connected to the plurality of source lines SL. The transceiver 211 may transmit the plurality of data signals S1 to Sk to the electrically connected plurality of source lines SL. When the transceiver 211 operates as a receiver, the transceiver 211 may be electrically connected to the plurality of column lines CL. The transceiver 211 may receive the plurality of pixel signals C1 to Cm from the electrically connected plurality of column lines CL. That is, the transceiver 211 may be electrically connected to the plurality of source lines SL or the plurality of column lines CL by dividing the time.

In some implementations, the transceiver 211 operates as a source driver and may simultaneously operate as a receiver. That is, the transceiver 211 may transmit the plurality of data signals S1 to Sk to the plurality of source lines SL of the pixel array 220 according to the source driver control signal CONT2 provided from the driving controller 213, and may receive the plurality of pixel signals C1 to Cm from the plurality of column lines CL.

The driving controller 213 receives the image data IS and the driving control signal CTRL from the host device and may control the row driver 212 and the transceiver 211. The image data IS provided from the host device may include the first image data rendered with the first resolution and second image data rendered with the second resolution, which is lower than the first resolution. The driving control signal CTRL provided from the host device may include control instructions for controlling the row driver 212 and transceiver 211, setting data, and the like. The driving controller 213 may control the row driver 212 and the transceiver 211 based on the driving control signal CTRL. For example, the driving control signal CTRL may include a horizontal synchronization signal HSYNC, a vertical synchronization signal VSYNC, a main clock signal MCLK, and a selection signal SEL. The driving controller 213 may generate data DATA by dividing the image data IS into one frame unit based on the vertical synchronization signal VSYNC, and dividing the image data IS into gate line GL units based on the horizontal synchronization signal HSYNC. The driving controller 213 synchronize the operations of the transceiver 211 and the row driver 212 by transmitting the row driver control signal CONT1 and the transceiver control signal CONT2 to the row driver 212 and the transceiver 211, respectively. For example, when the transceiver 211 operates as a receiver, the driving controller 213 may control the transceiver 211 and the row driver 212 such that the row driver 212 outputs the plurality of driving signals R1 to Rn. The driving controller 213 may control the row driver 212 and the transceiver 211 based on the control instructions generated independently of, or in addition to, the driving control signal CTRL received from the host device.

The driving controller 213 may track the position and motion of the user's eyes from the image data IDATA received from the transceiver 211. The driving controller 213 may transmit eye tracking data ED generated based on the image data IDATA to the host device.

In the present example, the plurality of display pixels DPX and the plurality of image sensing pixels IPX are connected to the gate line GL and the row line RL, respectively, to receive different driving signals. However, the display pixel DPX and the image sensing pixel IPX may be driven by the same signal, and this will be described later with reference to FIG. 7.

Some or all of the row driver 212, the transceiver 211, and the driving controller 213 may be implemented on the same substrate 230 as the pixel array 220. In some implementations, the row driver 212 and/or transceiver 211 may be implemented on the same substrate as the pixel array 220. In this case, the row driver 212 and/or transceiver 211 may be disposed in a peripheral portion of the pixel array 220. Some or all of the pixel driving circuits of the display pixel DPX and the image sensing pixel IPX, the row driver 212, the transceiver 211, and the driving controller 213 may be manufactured through a silicon wafer manufacturing process.

The display device 200 may include a display pixel DPX disposed in an interest region of the pixel array 220 and an image sensing pixel IPX disposed in a peripheral area of the interest region. The transceiver 211 of the display device 200 may output image data IDATA corresponding to the position and motion of the user's eye based on the pixel signal from the image sensing pixel IPX. Therefore, there is no need to use a separate camera device to track the user's gaze, thereby improving the form-factor and reducing manufacturing costs while maintaining the resolution of the display device.

Figure 3:
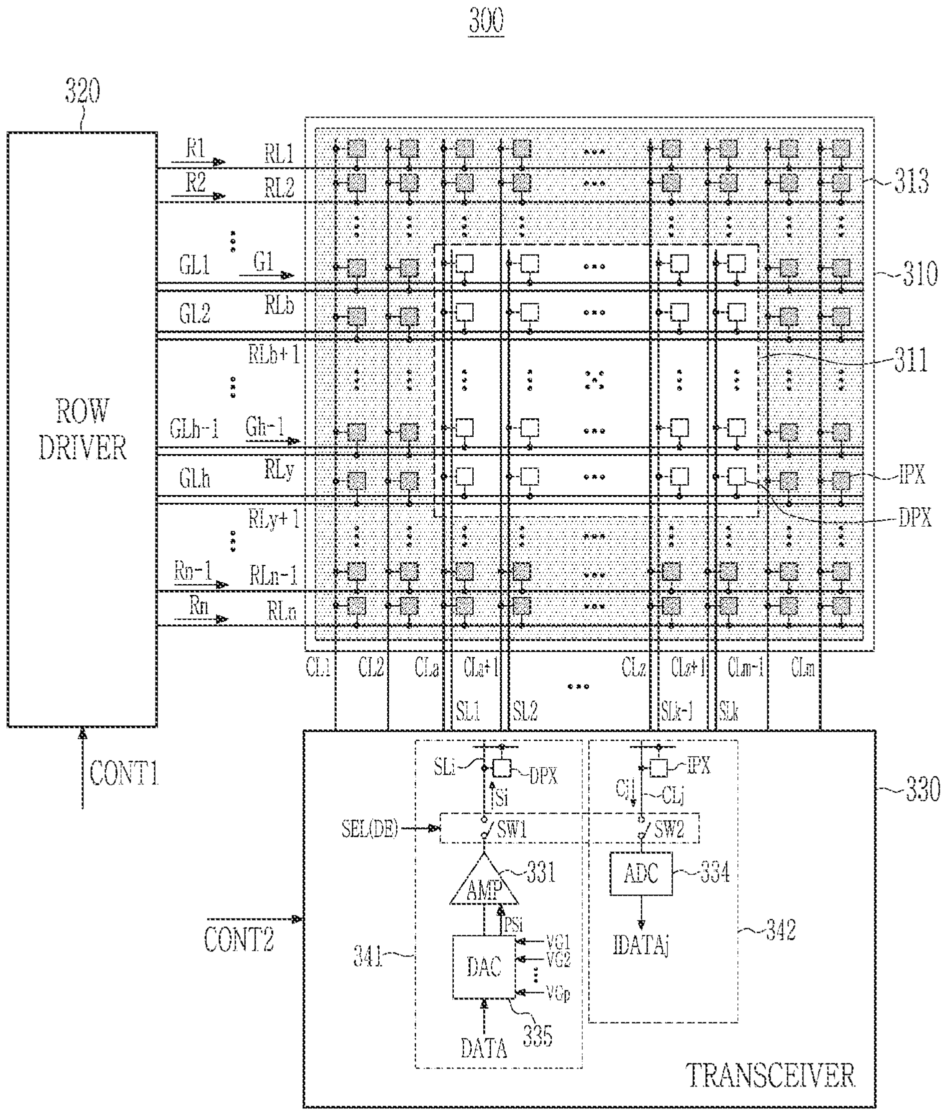
FIG. 3 is a block diagram of an example of a part of the display device.

FIG. 3 is a block diagram of an example of a part of the display device.

The display device 300 includes a pixel array 310, a row driver 320, and a transceiver 330. The pixel array 310 includes a plurality of display pixels DPX, a plurality of image sensing pixels IPX, a plurality of gate lines GL1 to GLh and a plurality of source lines SL1 to SLk connected to the plurality of display pixels DPX, a plurality of row lines RL1 to RLn and a plurality of column lines CL1 to CLm connected to the plurality of image sensing pixels IPX.

The pixel array 310 may include the plurality of display pixels DPX and the plurality of image sensing pixels IPX. In some implementations, the plurality of display pixels DPX may be disposed in a first region 311 and the plurality of image sensing pixels IPX may be disposed in a second region 313. In some implementations, the plurality of display pixels DPX may also be disposed in the second region 313. In some implementations, the display pixel DPX may be driven by gate signals G1 to Gh, and the image sensing pixel IPX may be driven by driving signals R1 to Rn. In another example, the display pixel DPX and the image sensing pixel IPX may be driven by the same gate signal.

The row driver 320 may receive a row driver control signal CONT1 and may transmit the gate signals G1 to Gh to the plurality of gate lines GL1 to GLh and the plurality of driving signals R1 to Rn to the plurality of row lines RL1 to RLn based on the row driver control signal CONT1.

The transceiver 330 may include an amplifier AMP 331, a source driver 341 including a digital-to-analog converter (DAC) 335, and a signal receiving portion 342 including an analog-to-digital converter (ADC) 334. In some implementations, the source driver 341 and the signal receiving portion 342 each may further include a first switch SW1 and a second switch SW2. The source driver 341 may be connected to a source line SLi of the display pixel DPX, and the signal receiving portion 342 may be connected to a column line CLj of the image sensing pixel IPX.

The DAC 335 may receive data DATA and convert the data DATA to an analog signal from a digital signal. For example, the DAC 335 may convert the data DATA in the form of a digital signal into an analog signal by matching a plurality of gamma voltage VG1 to VGp received from a gamma voltage generator (not shown) to the data DATA. The converted analog signal is transmitted to the amplifier 331 and becomes an input signal PSi for the amplifier 331.

The amplifier 331 may be connected to the source line SLi and the DAC 335 of the display pixel DPX. The amplifier 331 may be connected to the source line SLi of the display pixel DPX through a first switch SW1. The amplifier 331 may receive an input signal PSi from the DAC 335. The amplifier 331 may generate a data signal PSi by amplifying the DAC 335, and the generated data signal Si may be transmitted to the pixel array 310 through the source line SLi.

The ADC 334 may be connected to the column line CLj of the image sensing pixel IPX. The ADC 334 may be connected to the column line CLj of the image sensing pixel IPX through a second switch SW2. The ADC 334 may receive a pixel signal Cj from the column line CLj. The ADC 334 may generate pixel values corresponding to the plurality of image sensing pixels IPX by converting the pixel signal Cj in the form of a analog signal to digital data. In some implementations, the ADC 334 may include a buffer. The buffer may output image data IDATAj by amplifying a pixel value corresponding to the pixel signal Cj.

In some implementations, the first switch SW1 and the second switch SW2 included in the transceiver 330 may be controlled according to a level of the selection signal SEL (e.g., a data enable signal DE).

In some implementations, the transceiver 330 operates as a source driver and simultaneously as a receiver.

For example, when the selection signal SEL is at logic level "L", the first switch SW1 may be switched on and the second switch SW2 may be switched on. In other words, the transceiver 330 may operate simultaneously as a source driver and receiver. When the transceiver 330 operates as a source driver, the amplifier 331 may receive the input signal Psi from the DAC 335. The amplifier 331 may generate a data signal Si by amplifying the input signal PSi received from the DAC 335, and the generated data signal Si may be transmitted to the pixel array 310 through the source line SLi. When the transceiver 330 operates as a receiver, the ADC 334 may receive the pixel signal Cj from the column line CLj. The ADC 334 may convert the pixel signal Cj, which is the analog signal received from the column line CLj to a pixel value, which is a data signal such that the image data IDATAj can be output.

That is, when the row driver 320 outputs the gate signals G1 to Gh for driving the display pixel DPX and the driving signals R1 to Rn for driving the image sensing pixel IPX disposed in the pixel array 310, the transceiver 330 may transmit the plurality of data signals S1 to Sk through the plurality of source lines SL according to the source driver control signal CONT2 provided from the driving controller 213 (refer to FIG. 2), and receive the plurality of pixel signals C1 to Cm from the plurality of column lines CL.

In some implementations, the transceiver 330 operates as a source driver or receiver by dividing time.

For example, when the selection signal SEL is at logic level "L", the first switch SW1 may be switched on and the second switch SW2 may be switched off. In other words, transceiver 330 may operate as a source driver. When the transceiver 330 operates as a source driver, the amplifier 331 may receive the input signal PSi from the DAC 335. The amplifier 331 generates the data signal Si by amplifying the input signal PSi received from the DAC 335, and the generated data signal Si may be transmitted to the pixel array 310 through the source line SLi. For example, when the selection signal SEL is at logic level "H", the first switch SW1 may be switched off and the second switch SW2 may be switched on. That is, the transceiver 330 may operate as a receiver. When the transceiver 330 operates as a receiver, the ADC 334 may receive the pixel signal Cj from the column line CLj. The ADC 334 may convert the pixel signal Cj, which is an analog signal received from column line CLj, into a pixel value, which is a data signal, and output the image data IDATAj.

Hereinafter, an operation method of the display device will be described with reference to FIG. 4 to FIG. 6.

Figure 4:
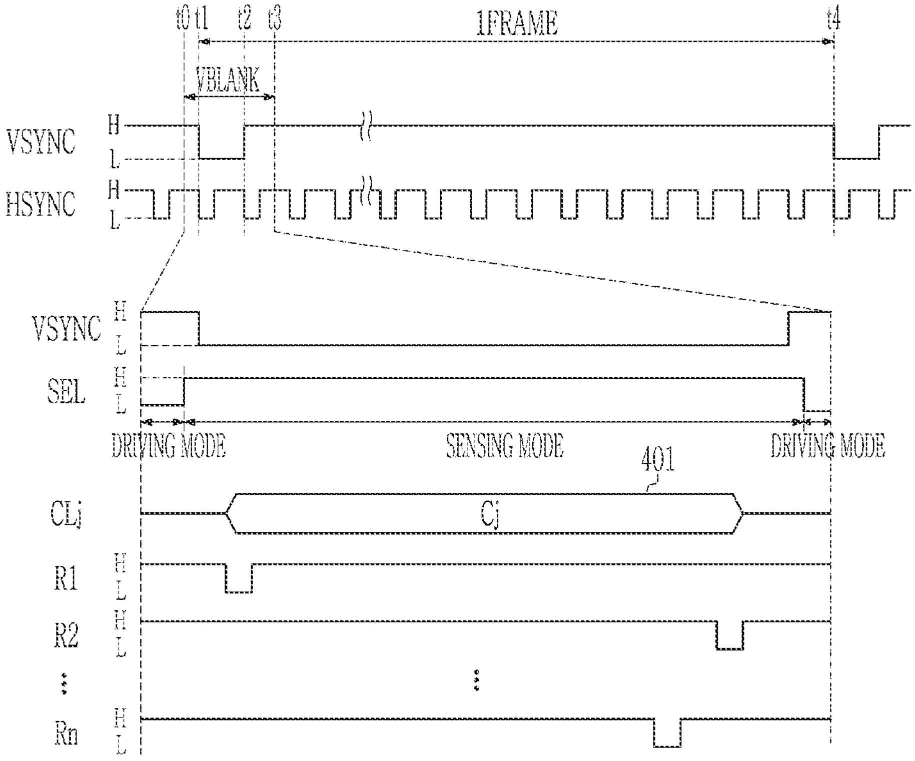
FIG. 4 is a timing diagram of an example of an operation method of the display device.
Figure 5:
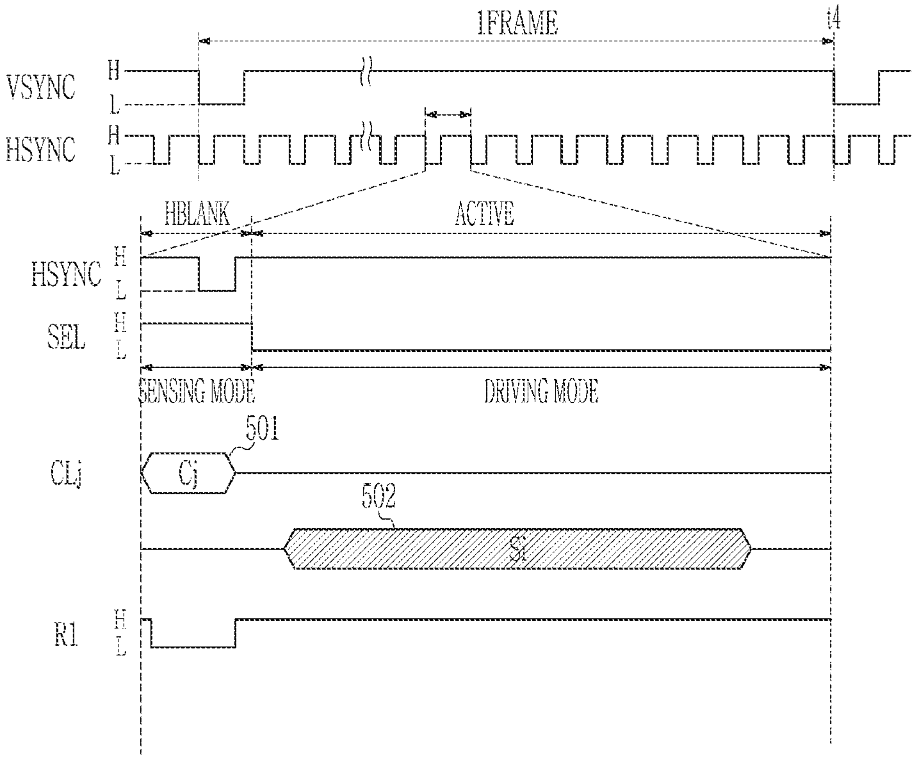
FIG. 5 is a timing diagram of an example of an operation method of the display device.

FIG. 4 and FIG. 5 are timing diagrams of an operation method of the display device. Specifically, the operation method of the display device includes a transceiver that divides time between operating as either a source driver or receiver.

Referring to FIG. 4, a pulse period (t1 to t4) of the vertical synchronization signal VSYNC may be one frame period 1 FRAME according to the display frame rate.

The vertical blank period VBLANK may include a period t1 to t2 during which the vertical synchronization signal VSYNC is at enable level ("L") and its peripheral periods. The vertical blank period VBLANK may include a period (t0 to t1) before the vertical synchronization signal VSYNC transitions from the disable level "H" to the enable level "L", a period (t1 to t2) during which the vertical synchronization signal VSYNC is at the enable level "L", and a period (t2 to t3) after the vertical synchronization signal VSYNC transitions to the disable level "H" from the enable level "L".

In the vertical blank period VBLANK, the selection signal SEL may transition to the logic level "H" from the logic level "L". When the selection signal SEL is at logic level "H", the row driver 320 (refer to FIG. 3) and the transceiver 330 (refer to FIG. 3) may operate in a sensing mode SENSING MODE. Specifically, during a period when the selection signal SEL is at the logic level "H", the row driver 320 may provide at least one of the driving signals R1 to Rn to at least one image sensing pixel IPX. In some implementations, the row driver 320 may provide the plurality of driving signals R1 to Rn to the plurality of row lines RL. For example, the row driver 320 may provide the driving signals R1 to Rn to all the row lines in a period during which the selection signal SEL is at the logic level "H". In some implementations, the row driver 320 may provide some of the plurality of driving signals R1 to Rn to some of the plurality of row lines RL to RLn. For example, the row driver 320 may provide the driving signals to even-numbered row lines in a period during which the selection signal SEL is at the logic level "H". As another example, the row driver 320 may provide a driving signal to a first low line in a period during which the selection signal SEL in a k-th (k is a positive number) vertical blank period VBLANK is at the logic level "H", and may provide a driving signal to a second row line following the first row line in a period during which the selection signal SEL in a (k+1)th vertical blank period VBLANK is at the logic level "H". In the sensing mode SENSING MODE, the second switch SW2 is switched on, and therefore the transceiver 330 may receive the pixel signal Cj 401 from the column line CLj and may output the image data IDATAj to the driving controller 213 (refer to FIG. 2).

When the selection signal SEL is at the logic level "L", the row driver 320 and transceiver 330 may operate in a driving mode DRIVING MODE. That is, the row driver 320 and the transceiver 330 may operate in the driving mode DRIVING MODE during one frame period (1 FRAME) excluding a portion of the vertical blank period VBLANK. In the driving mode DRIVING MODE, the first switch SW1 is switched on, and therefore the transceiver 330 may be synchronized to the horizontal synchronization signal HSYNC and may apply a data signal to the plurality of source lines SL. For example, whenever each pulse of the horizontal synchronization signal HSYNC is applied, the transceiver 330 may apply a data signal corresponding to the display pixel DPX connected to the gate line GL to which the gate signal is applied to the source line SL.

Referring to FIG. 5, the plurality of horizontal periods 1H may include a horizontal blank period HBLANK and an active period ACTIVE.

The horizontal blank period HBLANK may include a period during which a horizontal synchronization signal HSYNC is at the enable level "L" and a surrounding period. The active period ACTIVE may be the remaining period excluding the horizontal blank period HBLANK within one horizontal period 1H.

Within the active period ACTIVE, the selection signal SEL (or data enable signal DE) may transition from the logic level "H" to the logic level "L". When the selection signal SEL is at the logic level "L", the row driver 320 and the transceiver 330 may operate in the driving mode DRIVING MODE. In the driving mode DRIVING MODE, the first switch SW1 is switched on, and therefore, the transceiver 330 receives the data DATA from the driving controller 213 (refer to FIG. 2) and may apply the data signal to the plurality of source lines SL by being synchronized with the horizontal synchronization signal HSYNC. For example, the transceiver 330 may synchronize with the horizontal synchronization signal HSYNC and apply the data signal Si 502 corresponding to the display pixel DPX connected to the gate line GL to which the gate signal is applied to the source line SLi.

In some implementations, within the horizontal blank period HBLANK, the selection signal SEL may transition from the logical level "L" to the logical level "H". When the selection signal SEL is at the logic level "H", the row driver 320 and the transceiver 330 may operate in the sensing mode SENSING MODE. Specifically, in the sensing mode SENSING MODE, the row driver 320 may provide at least one of the driving signals R1 to Rn to at least one row line RL. Specifically, in a period during which the selection signal SEL is at the logic level "H", the row driver 320 may provide at least one of the driving signals R1 to Rn to at least one image sensing pixel IPX. In some implementations, the row driver 320 may provide the plurality of driving signals R1 to Rn to the plurality of row lines RL. For example, the row driver 320 may provide the driving signals R1 to Rn to all the row lines in a period during which the selection signal SEL is at the logic level "H". In some implementations, the row driver 320 may provide some of the plurality of driving signals R1 to Rn to some of the plurality of row lines RL to RLn. For example, the row driver 320 may provide the driving signals to even-numbered row lines in a period during which the selection signal SEL is at the logic level "H". As another example, the row driver 320 may provide a driving signal to a first row line while a selection signal SEL in an l-th (here, l is a positive number) horizontal blank period HBLANK is at the logic level "H", and may provide a driving signal to a second row line following the first row line while a selection signal SEL in an (I+1)th horizontal blank period HBLANK is at the logic level "H". In the sensing mode SENSING MODE, the second switch SW2 is switched on, therefore the transceiver 330 may receive the pixel signals C1 to Cn from the column line CL and output the image data IDATA to the driving controller 213 (refer to FIG. 2). For example, the transceiver 330 may receive the pixel signal Cj 501 from the image sensing pixel IPX connected to the driving line RL to which the driving signal is applied through the column line CLj. That is, the row driver 320 and the transceiver 330 may operate in the driving mode DRIVING MODE during the period excluding some sections of the horizontal blank period HBLANK of one horizontal period 1H.

In some implementations, the transceiver of the display device may operate as a source driver or a receiver by dividing time. That is, in some implementations, the transceiver may operate as a receiver during some periods of the vertical blank period VBLANK within one frame, and may operate as a source driver during periods other than some periods within another frame. In addition, the transceiver may operate as a receiver during some periods of the horizontal blank period HBLANK within one horizontal period and as a source driver during periods other than some periods within one horizontal period. Therefore, the coupling of signals that may occur between the two actions of detecting the position and motion of the user's eyes and displaying the image is reduced, and the position and motion of the user's eyes may be detected without changing the video timing.

Figure 6:
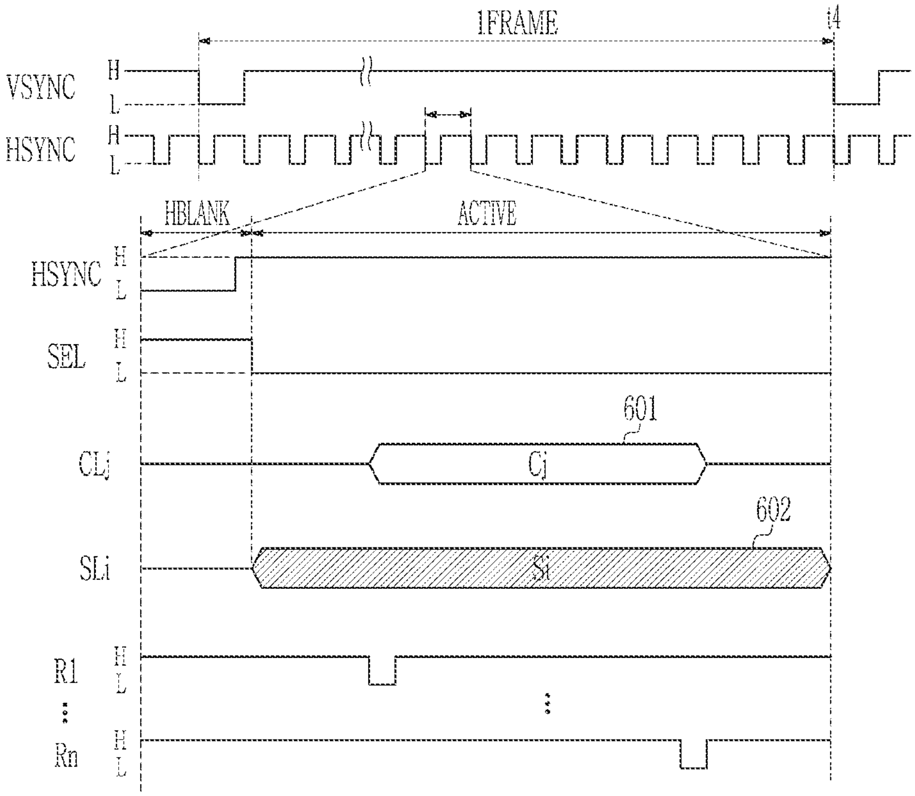
FIG. 6 is a timing diagram of an example of an operation method of the display device.

FIG. 6 is an example of a timing diagram of an operation method of the display device. In this example, the transceiver simultaneously operates as a source driver and as a receiver.

In some implementations, the transceiver 330 may simultaneously operate as a source driver and as a receiver based on the source driver control signal CONT2 provided from the driving controller 213 (refer to FIG. 2).

One cycle, that is, one frame period, of the vertical synchronization signal VSYNC may include a plurality of horizontal blank periods HBLANK and a plurality of active periods ACTIVE. In the active period ACTIVE, the transceiver 330 may operate as a source driver and a receiver. For example, the switch SW1 and the second switch SW2 of FIG. 3 both are switched on, and the row driver 320 may apply the gate signal G1 to a gate line (e.g., GL1) and may apply at least one of the driving signals R1 to Rn to at least one of the row lines RL1 to RLn. When the row driver 320 applies the gate signal G1 to the gate line GL1, the transceiver 330 may apply a data signal to the plurality of source lines SL. When the row driver 320 provides at least one of the driving signals R1 to Rn to the plurality of image sensing pixels IPX, the transceiver 330 may receive the pixel signals C1 to Cn from the column line CL. For example, the transceiver 330 is synchronized by the horizontal synchronization signal HSYNC and thus may receive a pixel signal Cj 601 from the image sensing pixel IPX connected to the driving line RL to which the driving signal is applied while applying a data signal Si 602 corresponding to the display pixel DPX connected to the gate line GL to which the gate signal is applied to the source line SLi.

As described, the transceiver 330 operates as a source driver and simultaneously as a receiver according to the source driver control signal CONT2 from the driving controller 213, or operates as a source driver or receiver by dividing time according to the selection signal SEL.

Figure 7:
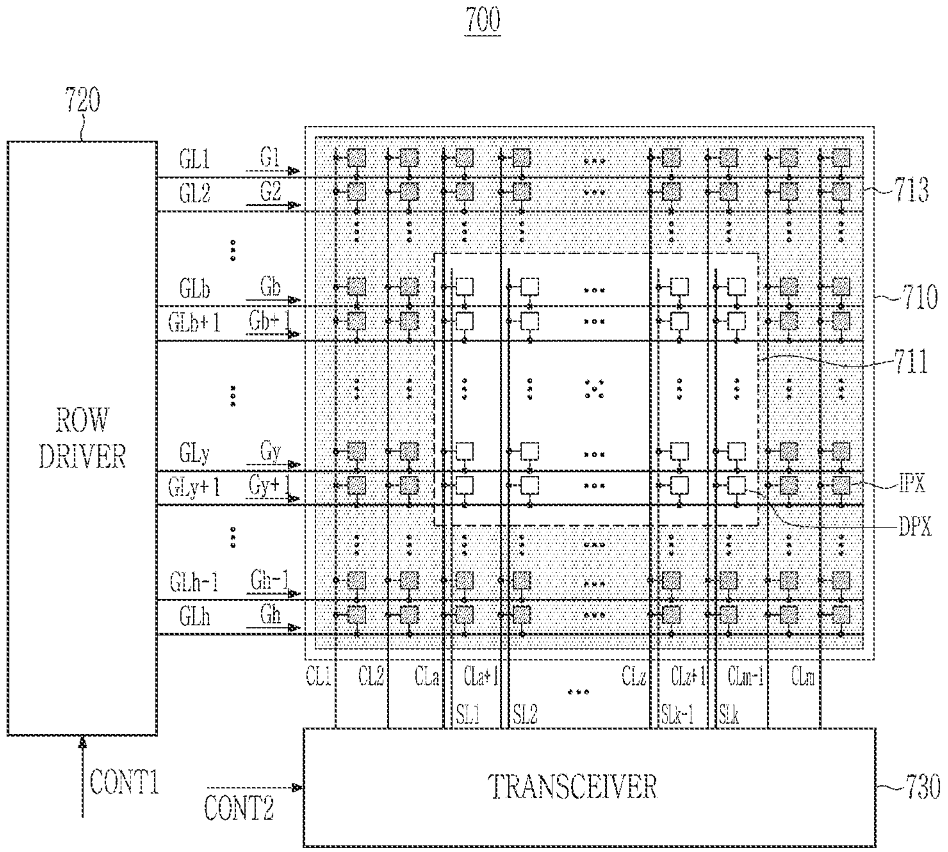
FIG. 7 is a block diagram that shows an example of a part of the display device.

FIG. 7 is a block diagram that shows a part of the display device.

Among the constituent elements of FIG. 7, description of parts that are the same or similar to the constituent elements in FIG. 2 and FIG. 3 will be omitted.

The display device 700 includes a pixel array 710, a row driver 720, and a transceiver 730. The pixel array 710 includes a plurality of display pixels DPX, a plurality of image sensing pixels IPX, a plurality of gate lines GL1 to GLh connected to the plurality of display pixels DPX and the plurality of image sensing pixels IPX, a plurality of source lines SL1 to SLk connected to the plurality of display pixel DPX, and a plurality of column lines CL1 to CLm connected to the plurality of image sensing pixels IPX.

The row driver 720 may apply the gate signals G1 to Gh to plurality of gate lines GL1 to GLh based on a row driver control signal CONT1. In some implementations, the plurality of display pixels DPX and the plurality of image sensing pixels IPX disposed in the pixel array 710 may be driven by the same gate signals G1 to Gh. In some implementations, the plurality of display pixels DPX and the plurality of image sensing pixels IPX disposed in the pixel array 710 may be simultaneously driven by the same gate signals G1 to Gh. In some implementations, driving transistors of the plurality of display pixels DPX and the plurality of image sensing pixels IPX disposed in the pixel array 710 may be the same type (N or P) of transistor.

When a gate signal of enable level is applied to the gate line GL connected to the display pixel DPX, the data signal applied to the source line SL connected to the display pixel DPX may be transmitted to the display pixel DPX. When the gate signal of enable level is applied to the gate line GL connected to the image sensing pixel IPX, the pixel signal from the image sensing pixel IPX may be transmitted to the column line CL.

In some implementations, the transceiver 730 may operate as a source driver while simultaneously operating as a receiver. For example, the row driver 720 may output the gate signals G1 to Gh, the transceiver 730 may receive the pixel signal from the image sensing pixel IPX through the column lines CL1 to CLm and may output the data signal to the display pixel DPX through the source lines SL1 to SLk.

In some implementations, the transceiver 730 may operate as a source driver or receiver by dividing time. That is, the transceiver 730 may operate as a source driver within a first time period and as a receiver within a second time period different from the first time period. For example, within the first time period, the row driver 720 may output gate signals Gb, Gb+1, . . . , Gy, and Gy+1, and the transceiver 730 may output the data signal to the display pixel DPX through the source lines SL1 to SLk. Within the second time period, the row driver 720 may output the gate signals G1 to Gh, and the transceiver 730 may receive the pixel signal from the image sensing pixel IPX through the column lines CL1 to CLm.

The operation method of the transceiver 730 is similar to the operation method shown in FIG. 4 to FIG. 6, and therefore repeated description of this is omitted.

The image sensing pixel IPX and display pixel DPX in the pixel array may be driven by the same gate signals G1 to Gh. Therefore, in some implementations, the image sensing pixel IPX and the display pixel DPX in the pixel array are connected to the same gate lines GL1 to GLh such that the size and manufacturing cost of the display device can be reduced.

FIG. 8 to FIG. 14 are top plan views of examples of pixel arrangement of pixel arrays. Hereinafter, examples of pixel arrangement of pixel arrays are described, and the structure and operation method of the row driver and transceiver may be based on the descriptions in FIG. 1 to FIG. 7, and therefore detailed description thereof will be omitted.

Figure 8:
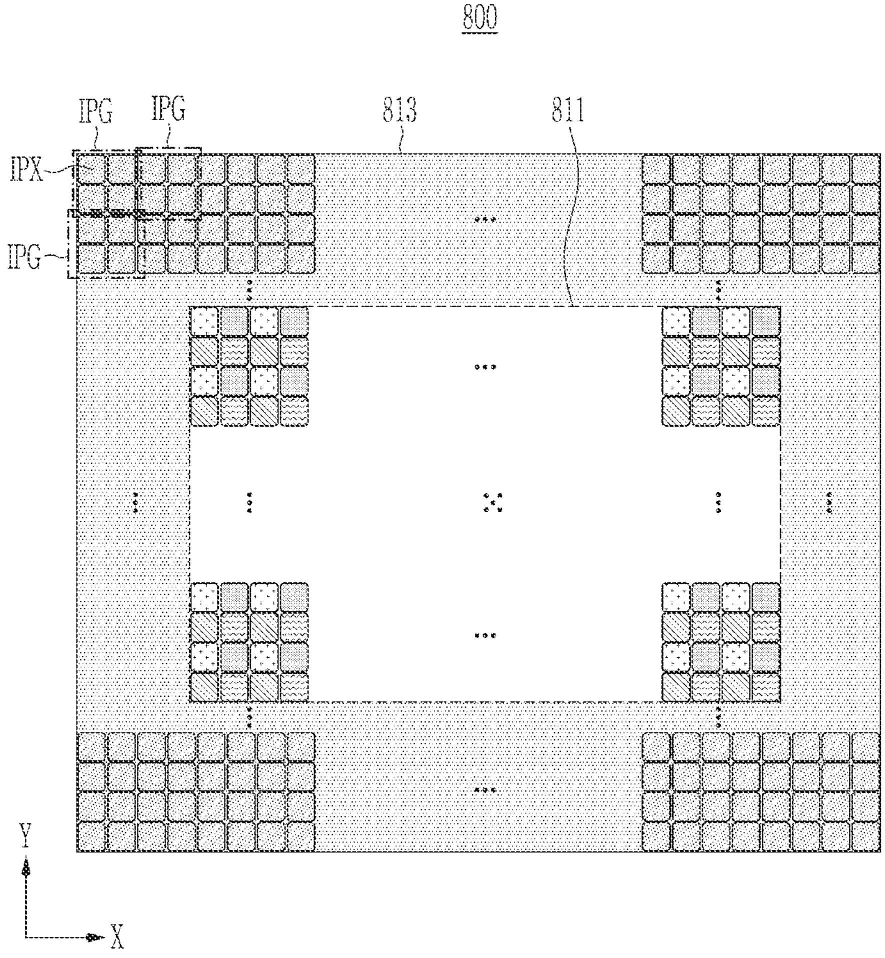
FIGS. 8, 9, 10, 11, 13, and 14 are top plan views of examples of pixel arrangement of a pixel array.

FIG. 8 is a top plan view of pixel arrangement of a pixel array.

Referring to FIG. 8, a pixel array 800 may include a first region 811 and a second region 813 at the periphery of the first region 811. The first region 711 may be an interest region where the user's gaze generally settles or is fixed. In the first region 811, a plurality of display pixels DPX for displaying images may be positioned. The second region 713 may be a peripheral area. A plurality of image sensing pixels IPX for generating image signals corresponding to the user's eye may be disposed in the second region 813. In some implementations, the second region 813 may include a plurality of image sensing pixel groups IPG. Each image sensing pixel group (IPG may include a plurality of image sensing pixels IPX. The plurality of image sensing pixels IPX may be arranged in an A×B format (where A and B are both arbitrary natural numbers). Hereinafter, one image sensing pixel group IPG includes four image sensing pixels IPX, and four pixels within one pixel group are described as being arranged in a 2×2 shape, but the arrangement is not limited thereto.

In some implementations, the row driver control signal CONT1 (refer to FIG. 2) may instruct to drive only at least some image sensing pixels IPX in an image sensing pixel group IPG for each frame for low-power driving of the display device. For example, the row driver control signal CONT1 may instruct to apply a driving signal to low lines connected to some image sensing pixels IPX in the image sensing pixel group IPG disposed in the second region 813 while applying a gate signal to the gate lines connected to the display pixel DPX disposed in the first region 811.

In some implementations, the row driver control signal CONT1 may instruct to drive only image sensing pixels IPX disposed in the first tow in the plurality of image sensing pixel groups IPG. For example, the row driver 212 (refer to FIG. 2) may apply row signals R1, R3, . . . to odd-numbered row lines RL1, RL3, . . . among the plurality of row lines RL1 to RLn connected to the plurality of image sensing pixels IPX based on the row driver control signal CONT1. In some implementations, the row driver control signal CONT1 may instruct to drive only the image sensing pixel IPX disposed in the second row of the plurality of image sensing pixel group IPG. For example, the row driver 212 may apply row signals R2 and R4, to even-numbered row lines RL2, RL4, . . . among the plurality of row lines RL1 to RLn connected to the plurality of image sensing pixels IPX based on the row driver control signal CONT1. In some implementations, the row driver control signal CONT1 may instruct to drive only the image sensing pixel IPX within some plurality of image sensing pixel groups IPG among the plurality of image sensing pixel groups IPG.

In some implementations, the transceiver may receive pixel signals from the plurality of image sensing pixels IPX based on the source driver control signal CONT2. In some implementations, the transceiver may receive a pixel signal from some of the plurality of image sensing pixels IPX based on the source driver control signal CONT2. For example, the transceiver 211 (refer to FIG. 2) may receive the pixel signals C1, C3, . . . from the odd-numbered column lines CL1, CL3, . . . among the plurality of image sensing pixels IPX based on the source driver control signal CONT2. For example, the transceiver 211 (refer to FIG. 2) may receive the pixel signals C2, C4, . . . from the even-numbered column lines CL2, CL4, . . . among the plurality of image sensing pixels IPX based on the source driver control signal CONT2. In some implementations, the source driver control signal CONT2 may instruct the transceiver 211 to receive the pixel signal from the image sensing pixel IPX within some image sensing pixel groups IPG among the plurality of image sensing pixel group IPG.

The display device, in some implementations, may include a plurality of image sensing pixel groups IPG in some regions of the pixel array and may drive only some image sensing pixels IPX within the image sensing pixel groups IPG for each frame. Therefore, in some implementations, the image sensing pixel IPX may be selectively driven to acquire an image in a low-power driving method and output an image signal corresponding to the user's eyes.

Figure 9:
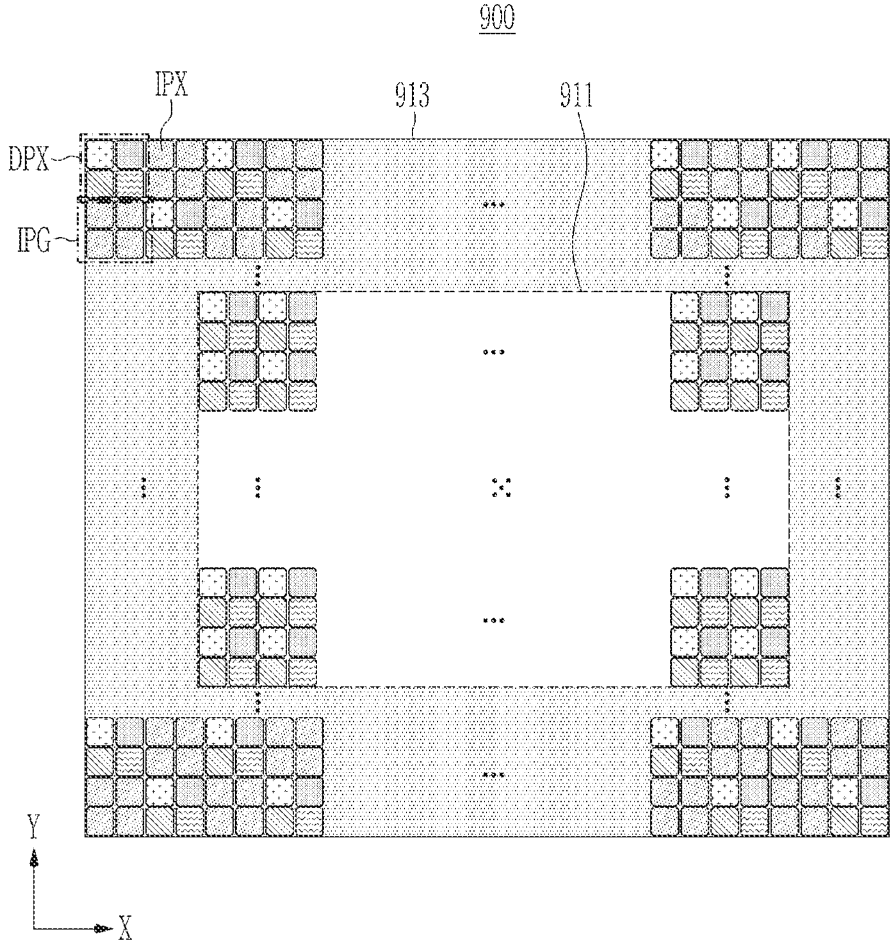

FIG. 9 is a top plan view of an example of a pixel arrangement of a pixel array.

Referring to FIG. 9, a pixel array 900 includes a first region 911 and a second region 913 at the periphery of the first region 911. A plurality of display pixels DPX may be disposed in the first region 911. A plurality of display pixels DPX for displaying an image and a plurality of image sensing pixels IPX for generating image signals corresponding to the user's eye may be disposed in the second region 913. In some implementations, the image sensing pixel groups IPG including the plurality of image sensing pixels IPX and the display pixels DPX may be alternately disposed in the second region 913.

In some implementations, the row driver control signal CONT1 (refer to FIG. 2) may instruct to drive only some image sensing pixels IPX in the image sensing pixel group IPG for low-power driving of the display device. The driving method for low-power operation of the display device is similar to the driving method described with reference to FIG. 8, and therefore detailed description of the driving method is omitted.

Figure 10:
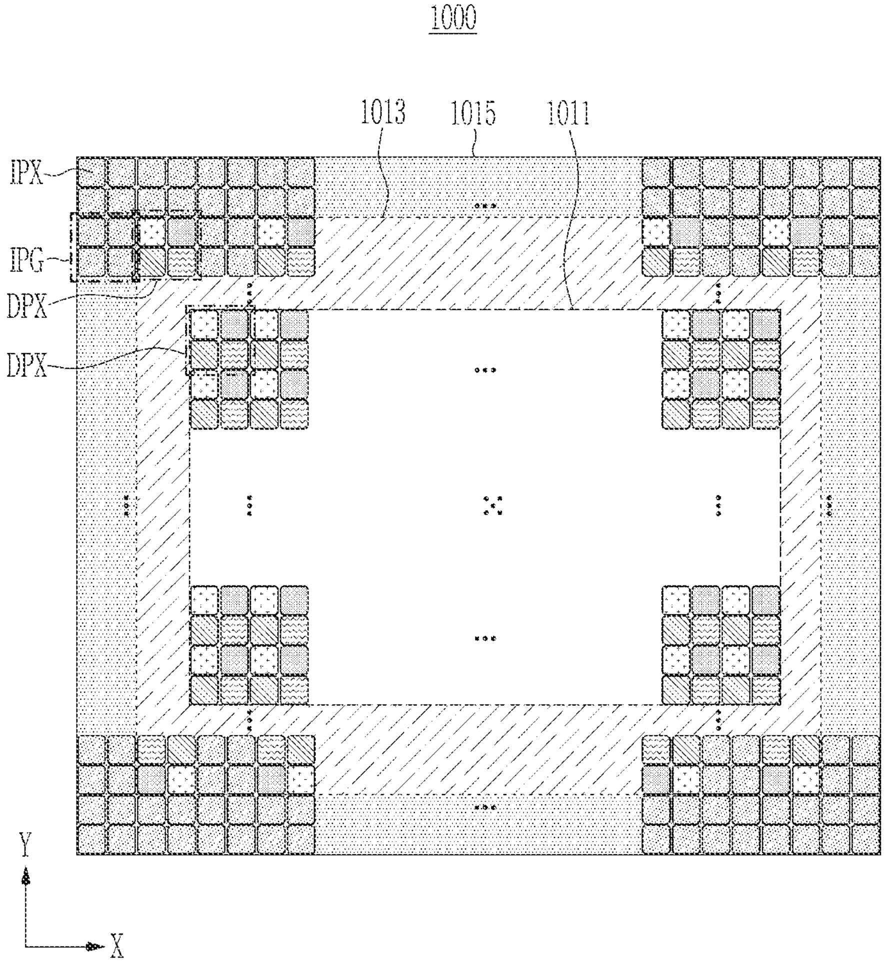

FIG. 10 is a top plan view of an example of a pixel arrangement of a pixel array.

Referring to FIG. 10, a pixel array 1000 includes a first region 1011, a second region 1013, and a third region 1015 at the periphery of the first region 1011. A plurality of display pixels DPX for displaying an image may be disposed in the first region 1011. A plurality of display pixels DPX for displaying an image and a plurality of image sensing pixels IPX for generating image signals corresponding to the user's eye may be disposed in the second region 1013. A plurality of image sensing pixels IPX for generating image signals corresponding to the user's eye may be disposed in the third region 1015.

In some implementations, the third region 1015 may be the outermost region of the pixel array 1000. The third region 1015 may be a region furthest away from an interest region where the user's gaze settles or is fixed in the pixel array 1000. The third region 1015 may include a plurality of image sensing pixel groups IPG arranged along the edge of the pixel array 1000. The second region 1030 may be disposed in the first region 1011 and the third region 1015. In some implementations, the image sensing pixel groups IPG including the plurality of image sensing pixels IPX and the display pixels DPX may be alternately disposed in the second region 1013.

In some implementations, the row driver control signal CONT1 (refer to FIG. 2) may instruct the row driver 212 to drive only some image sensing pixels IPX in the image sensing pixel group IPG for low-power driving of the display device. The driving method for low-power operation of the display device is similar to the driving method described with reference to FIG. 8, and therefore repeated description of the driving method is omitted.

Figure 11:
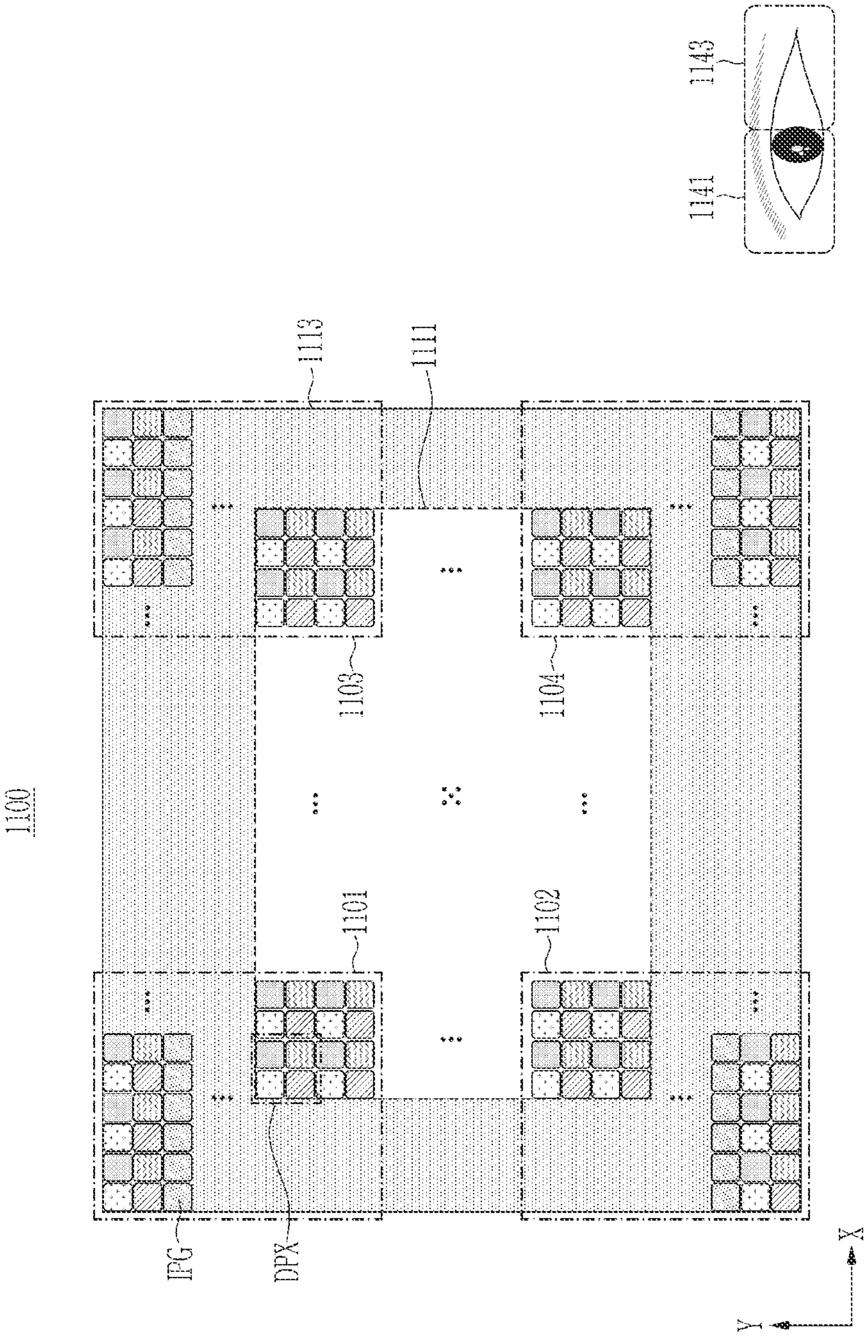

FIG. 11 is a top plan view of an example of pixel arrangement of a pixel array.

Referring to FIG. 11, a pixel array 1100 includes a first region 1111 and a second region 1113 at the periphery of the first region 1111. A plurality of display pixels DPX for displaying an image may be disposed in the first region 1111.

In some implementations, a first corner region 1101 (e.g., an upper left portion of the pixel array 1100) may be defined in a portion where a first edge of the first region 1111 and a first edge of the second region 1113 are adjacent to each other, and a second corner region 1102 (e.g., a lower left portion of the pixel array 1100) may be defined in a portion where a second edge of the first region 1111 and a second region of the second region 1113 are adjacent to each other. In some implementations, a third corner region 1103 (e.g., an upper right portion of the pixel array 1100) may be defined in a portion where a third edge of the first region 1111 and a third edge of the second region 1113 are adjacent to each other, and a fourth corner region 1104 (e.g., a lower right portion) may be defined in a portion where a fourth edge of the first region 1111 and a fourth edge of the second region 1113 are adjacent to each other. Here, the first corner region 1101 and the fourth corner region 1104 may be symmetrical with a center of the pixel array 1100 as a reference, and the second corner region 1102 and the third corner region 1103 may be symmetrical with the center of the pixel array 1100 as a reference. In some implementations, each corner region may be a region including a point where a tangent extending in a first direction X among a plurality of tangents at the topmost point and a plurality of tangents at the bottommost point of the pixel array 1100 and a tangent extending in a second direction Y among a plurality of tangents at the leftmost point and a plurality of tangent at the rightmost point of the pixel array 1100 cross. In FIG. 11, each corner region has a quadrangle planar shape, but the present disclosure is not limited to this, and each corner region may have a polygon planar shape, a circular planar shape, or an oval planar shape.

In some implementations, a length of each corner region in the first direction X may not exceed the half of a length of the pixel array 1100 in the first direction X, and a length of each corner region in the second direction Y may not exceed the half of a length of the pixel array 1100 in the second direction Y.

In some implementations, an image sensing pixel IPX may be disposed in a region where the second region 1113 and each corner region overlap. The display pixel DPX may also be disposed in the region where the second region 1113 and each corner region overlap. In some implementations, the image sensing pixel IPX may be disposed in the second region 1113 in each corner region. The display pixel DPX may also be disposed in the second region 1113 of each corner region.

In some implementations, the row driver 212 (refer to FIG. 2) may drive only image sensing pixels IPX disposed in some corner regions among the plurality of corner regions of the pixel array 1100 depending on a direction in which the display device is mounted on a wearable device. In some implementations, the row driver 212 may drive only image sensing pixels IPX disposed in a corner region disposed in a corner region placed below with the user's eyes as a reference among the plurality of corner regions of the pixel array 1100 depending on a direction in which the display device is mounted on a wearable device. When the user wears a wearable device, the user's eyes may be disposed in a region substantially equivalent to a region of the first region 1111 in the second direction Y. This will be described with reference to FIG. 12A and FIG. 12B.

Figure 12A:
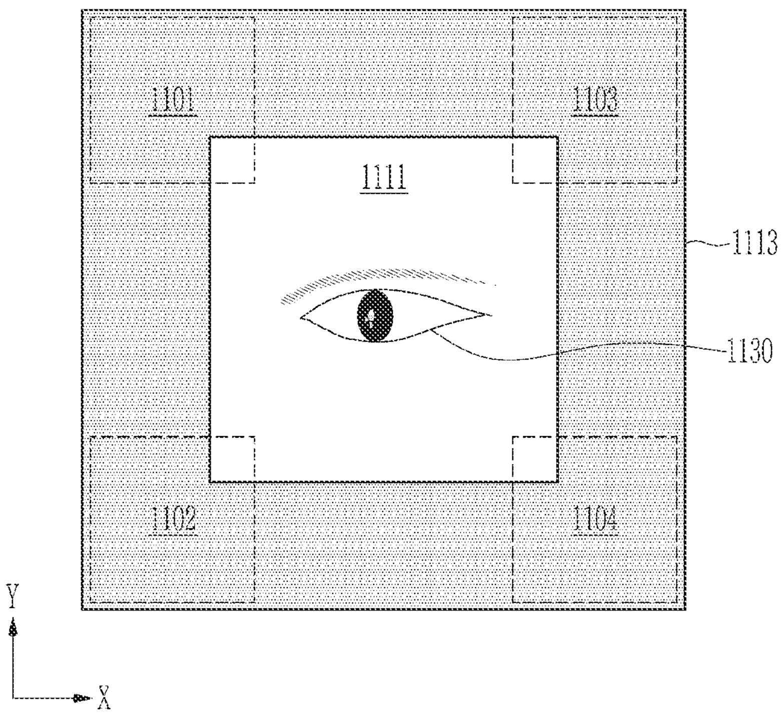
FIG. 12A and FIG. 12B depict examples of a pixel arrangement of the pixel array.
Figure 12B:
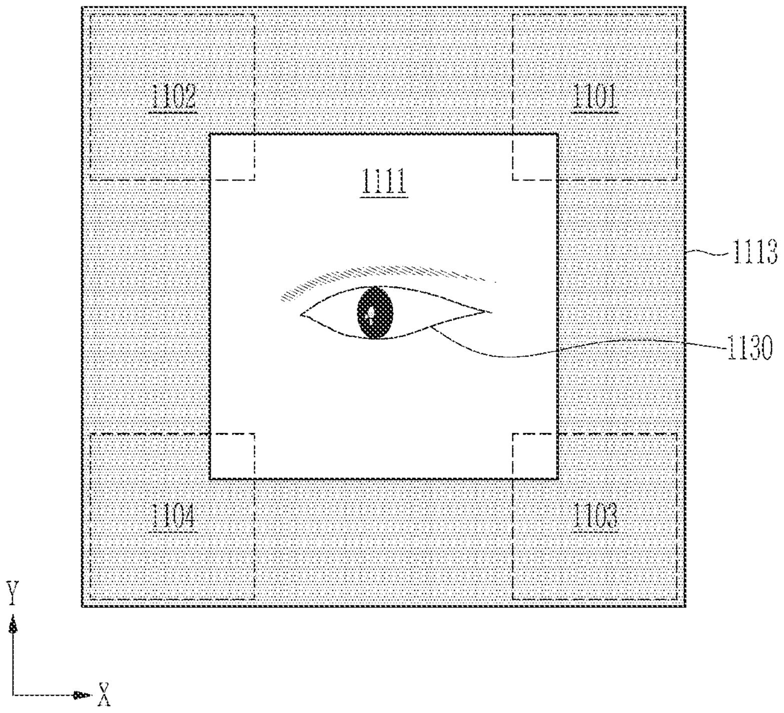

Referring to FIG. 12A, when the display device is mounted on the wearable device in a random direction, the row driver 212 may drive only the image sensing pixel IPX that is disposed in the corner region placed below the user's eyes as a reference among the plurality of image sensing pixel IPX. When the user wears the wearable device, the user's eyes 1130 may be disposed in a region substantially equivalent to a region of the first region 1111 in the second direction Y. In some implementations, the corner regions placed below the user's eyes as a reference may be the second corner region 1102 and the fourth corner region 1104. Therefore, the row driver 212 may drive the image sensing pixel IPX disposed in the second corner region 1102 and the fourth corner region 1104 among the plurality of image sensing pixel IPX. Referring to FIG. 12B, when the display device is mounted on a wearable device in any direction (e.g., 90-degree rotation from the direction of FIG. 12A to the clockwise direction) different from FIG. 12A, the row driver 212 may drive only the image sensing pixel IPX disposed in the corner region placed below with the user's eyes as a reference among the plurality of image sensing pixels IPX. When the user wears the wearable device, the user's eyes 1130 may be disposed in a region substantially equivalent to a region of the first region 1111 in the second direction Y. In some implementations, the corner regions placed below the user's eyes as a reference may be the third corner region 1103 and the fourth corner region 1104. Therefore, the row driver 212 may drive the image sensing pixel IPX disposed in the third corner region 1103 and the fourth corner region 1104 among the plurality of image sensing pixels IPX.

Referring back to FIG. 11, in some implementations, the image sensing pixel IPX, which is driven according to the direction in which the display device is mounted on the wearable device, separates the user's eyes into a first portion 1141 and a second portion 1143, detects the position and motion of the eyes, and outputs a corresponding image signal accordingly. For example, when the display device mounted on a wearable device as shown in FIG. 11, that is, when the display device is mounted on the wearable device in a third direction, the image sensing pixel IPX disposed in the corner region placed below with the user's eyes as a reference, that is, the second corner region 1102 and the fourth corner region 1104, may be driven. The image sensing pixel IPX in the second corner region 1102 may detect the position and motion of the eye (or pupil) in the first portion 1141 of the user's eye, and the image sensing pixel IPX in the fourth corner region 1104 may detect the position and motion of the eye (or pupil) in the second portion 1143 of the user's eye. For example, when the display device mounted on a wearable device in a direction that is different from FIG. 11, the image sensing pixel IPX disposed in the corner region placed below with the user's eye as a reference among the plurality of corner regions of the pixel array 1100 is driven, and the image sensing pixel IPX of each corner region detects the position and motion of each of the portions 1141 and 1143 of the user's eye.

In some implementations, an image signal corresponding to the user's eye detected by the image sensing pixel IPX may be output as a pixel signal Cj through the column line CLj connected to the image sensing pixel IPX. In some implementations, the transceiver 211 (refer to FIG. 2) may generate image data IDATAj from the pixel signal Cj and output it to the driving controller 213 (refer to FIG. 2). In some implementations, the driving controller 213 merges pixel values corresponding to the position and motion of the user's eyes in the first portion 1141 and pixel values corresponding to the position and motion of the user's eyes in the second portion 1143 to track the position and motion of the user's eyes, and the transmits the merged value to the host device.

In some implementations, the image sensing pixel IPX may be positioned on the outside of each corner region or the image sensing pixel IPX and the display pixel DPX may be positioned at the intersection, but the positions of the pixels in the respective corner regions are not limited thereto.

Figure 13:
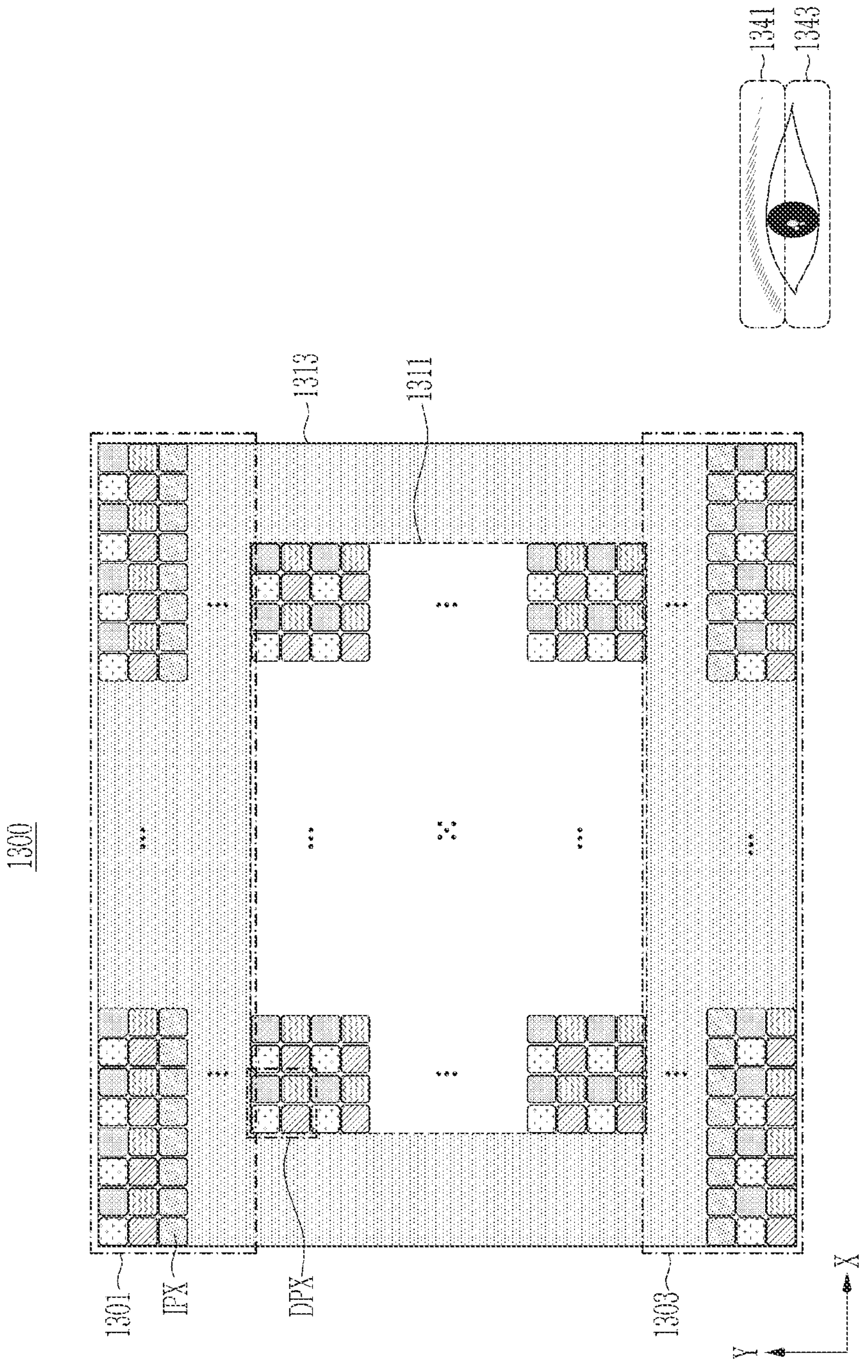

FIG. 13 is a top plan view of an example of a pixel arrangement of a pixel array.

Referring to FIG. 13, a pixel array 1300 includes a first region 1311 and a second region 1313 at the periphery of the first region 1311. As plurality of display pixels DPX for displaying an image may be disposed in the first region 1311.

In some implementations, pixels may be disposed in an upper region 1301 and a lower region 1303 of the second region 1313. In some implementations, the upper region 1301 may refer to a region disposed above the first region 1311 among the second regions 1313, depending on a direction in which the display device is mounted on the wearable device. In some implementations, the lower region 1303 may refer to a region disposed below the first region 1311 among the second regions 1313, depending on the direction in which the display device is mounted on the wearable device. A plurality of image sensing pixels IPX may be disposed in the upper region 1301 and the lower region 1303. A plurality of display pixels DPX may also be disposed in the upper region 1301 and the lower region 1303. In some implementations, the row driver 212 (refer to FIG. 2) may drive the image sensing pixel IPX disposed in at least one region among the upper region or lower region.

In some implementations, the image sensing pixels IPX disposed in the upper region 1301 and lower region 1303 may separate the user's eyes into a third portion 1341 and a fourth portion 1343, detect the position and motion of the user's eyes, and generate a corresponding image signal. For example, the image sensing pixel IPX in the upper region 1301 may detect the position and motion of the user's eye (or pupil) in the third portion 1341 of the user's eye, and the image sensing pixel IPX in the lower region 1303 may detect the position and motion of the user's eye (or pupil) in the third portion 1343 of the user's eye.

In some implementations, the image signal corresponding to the user's eye detected by the image sensing pixel IPX may be output as a pixel signal Cj through the column line CLj connected to the image sensing pixel IPX. In some implementations, the transceiver 211 (refer to FIG. 2) may convert the pixel signal Cj into a pixel value and output it to the driving controller 213 (refer to FIG. 2). In some implementations, the driving controller 213 merges pixel values corresponding to the position and motion of the user's eyes in the third portion 1341 and pixel values corresponding to the position and motion of the user's eyes in the fourth portion 1343 to track the position and motion of the user's eyes, and then transmits the merged value to the host device. For example, the driving controller 213 may generate an image data of user's eyes using pixel values corresponding to the position and motion of the user's eyes in the third portion 1341 as an upper portion of the image data and using pixel values corresponding to the position and motion of the user's eyes in the fourth portion 1343 as a lower portion of the image data.

In some implementations, the image sensing pixel IPX may be placed on the outside of each region or the image sensing pixel IPX and the display pixel DPX may be placed at the intersection, but the positions of the pixels in the upper region 1301 and the lower region 1303 are not limited thereto.

Figure 14:
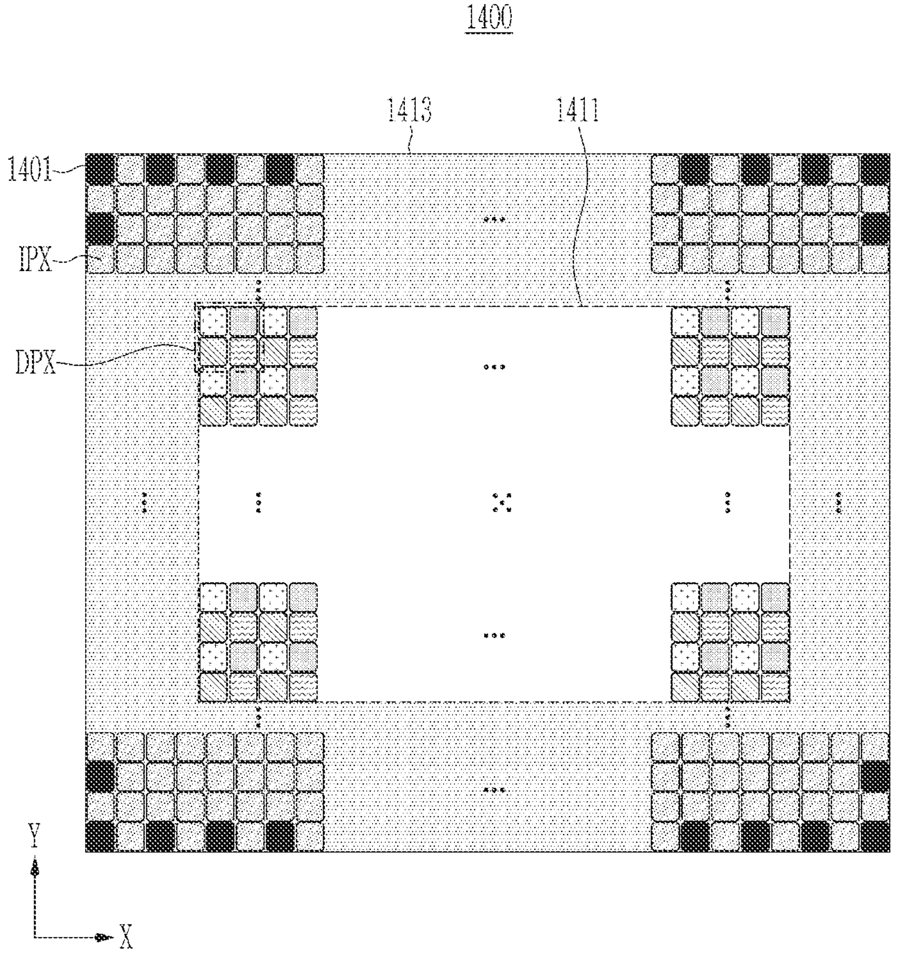

FIG. 14 is a top plan view of an example of a pixel arrangement of a pixel array.

Referring to FIG. 14, the pixel array 1400 includes a first region 1411 and a second region 1413 at the periphery of the first region 1411. A plurality of display pixels DPX for displaying an image may be disposed in the first region 1411. A plurality of image sensing pixels IPX for generating image signals corresponding to the user's eyes may be disposed in the second region 1413. A plurality of display pixels DPX for displaying an image may also be disposed in the upper region 1301 and the lower region 1413.

In some implementations, a light-emitting pixel 1401 that generates light directed to the eye may be further positioned in the second region 1413 so that the light reflected by the user's eye can be detected by the plurality of image sensing pixels IPX. The image sensing pixel IPX may detect the light emitted by the light-emitting pixel 1401 and reflected by the user's eyes. In some implementations, light emitted by the light-emitting pixel 1401 may be infrared ray. In some implementations, the light-emitting pixel 1401 may include a pixel driving circuit including a driving transistor and an LED that emits infrared light.

In FIG. 14, only the image sensing pixel IPX and the light-emitting pixel 1401 are disposed in the second region 1413, but this is not restrictive, and the plurality of image sensing pixel IPX and the plurality of display pixel DPX may be disposed in the second region 1413 in various ways according to FIG. 8 to FIG. 13, together with the light-emitting pixel 1401.

In some implementations, there is no need to use a separate light emitting device to generate light directed to the user's eyes to track the user's gaze, thereby improving the form factor of the display device and reducing manufacturing costs.

Figure 15:
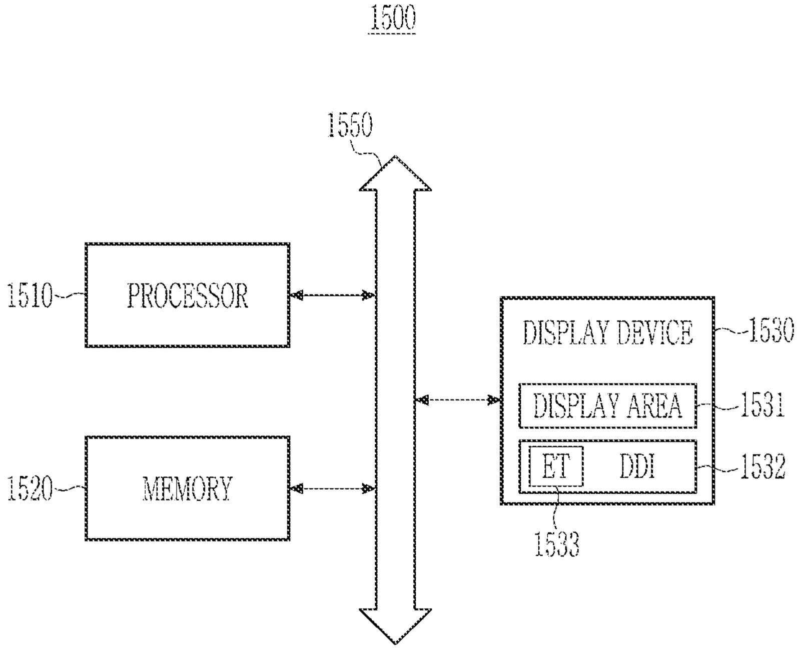
FIG. 15 is a schematic of an example of a semiconductor system.

FIG. 15 depicts a schematic of an example of a semiconductor system 1500, which includes a processor 1510, a memory 1520, and a display device 1530 that are electrically connected to a system bus 1550.

The processor 1510 controls an input/output of data of the memory 1520 and the display device 1530 and may perform image processing of image data transmitted between corresponding devices.

The memory 1520 may include a volatile memory such as a dynamic random access memory (DRAM) and/or a non-volatile memory such as a flash memory. The memory 1520 may be formed of a DRAM, a phase-change random access memory (PRAM), a magnetic random access memory (MRAM), a resistive random access memory (ReRAM), a ferroelectric random access memory (FRAM), a NOR flash memory, a NAND flash memory, a fusion flash memory (e.g., memory that combines a static random access memory (SRAM) buffer, NAND flash memory, and NOR interface logic). The memory 1520 may store video signals processed by the processor 1510.

The display device 1530 may include a pixel array 1531 and a display driver integrated circuit (IC) 1532, and the display driver IC 1532 may include an eye tracking (ET) sensor 1533. The display device 1530 may display image data applied through the system bus 1550 to the pixel array 1531. The display device 1530 may track the position and motion of the user's eyes and output eye tracking data through the system bus 1550. The pixel array 1531 may include display pixels and image sensing pixels, depending on examples. The pixel array 1531 may include a first region where display pixels are disposed and a second region where image sensing pixels are disposed. The first region may be a central region where the user's gaze settles, and the second region may be a peripheral area around the central region. The display pixels may be further disposed in the second region. The display driver IC 1532 may provide a driving signal to the display pixel and the image sensing pixel. In some implementations, the driving signal may be a different signal, and in other implementations, the driving signal may be the same signal. The display driving IC 1532 may applies a data signal to the display pixel and may receive a pixel signal from the image sensing pixel. The display driving IC 1532 may include a transceiver that operates selectively as a source driver or receiver. The display driving IC 1532 may include a transceiver operating simultaneously as a source driver and as a receiver.

The semiconductor system 1500 may be installed in mobile electron products such as smartphones, but is not limited thereto, and may be installed in various types of electron products that display images.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:

a plurality of first display pixels disposed in a first region of a substrate;

a plurality of image sensing pixels that are disposed in a second region of the substrate, the second region of the substrate being positioned at a periphery of the first region of the substrate, wherein the plurality of image sensing pixels are configured to generate pixel signals;

a driving circuit that is disposed on the substrate and configured to generate a plurality of first data signals based on input image data, provide the plurality of first data signals to the plurality of first display pixels, receive the pixel signals from the plurality of image sensing pixels, and generate image data corresponding to a user's gaze based on the pixel signals;

a plurality of gate lines coupled to the driving circuit, wherein at least one image sensing pixel and at least one first display pixel are configured to be driven by a same gate line of the plurality of gate lines; and a plurality of second display pixels disposed in the second region, wherein the input image data comprises first image data rendered with first resolution and second image data rendered with second resolution, wherein the second resolution is lower than the first resolution, and wherein the driving circuit is configured to generate the plurality of first data signals based on the first image data, generate a plurality of second data signals based on the second image data, and provide the plurality of second data signals to the plurality of second display pixels.

2. The display device of claim 1, wherein the driving circuit comprises:

a digital to analog converter that is configured to generate an input signal by converting the input image data;

an amplifier that is connected to the digital to analog converter and is configured to amplify the input signal;

an analog to digital converter that is configured to convert the pixel signals to pixel values, respectively;

a first switch that is connected between a source line and the amplifier, wherein the source line is connected to a corresponding display pixel among the plurality of first display pixels; and a second switch that is connected between a column line and the analog to digital converter, wherein the column line is connected to a corresponding image sensing pixel among the plurality of image sensing pixels.

3. The display device of claim 2, wherein the driving circuit is configured to generate the plurality of first data signals based on the input image data during a first time period, and the driving circuit is configured to generate the image data based on the pixel signals during a second time period, wherein the first time period is different from the second time period.

4. The display device of claim 3, wherein the driving circuit is configured to receive a switch control signal for controlling the first switch and the second switch from an external device that is external to the display device, and wherein, based on the switch control signal, the driving circuit is configured to either turn on the first switch and turn off the second switch for the first time period or turn off the first switch and turn on the second switch for the second time period.

5. The display device of claim 2, wherein the driving circuit is configured to receive a switch control signal for controlling the first switch and the second switch from an external device that is external to the display device, wherein, based on the switch control signal, the driving circuit is configured to either turn on the first switch and turn on the second switch during a first time period or turn off the first switch and turn off the second switch during a second time period, wherein the second time period is different from the first time period.

6. The display device of claim 1, wherein the display device comprises a pixel array including the first region and the second region, wherein the pixel array comprises a first corner region, a second corner region, a third corner region, and a fourth corner region, wherein each of the first, second, third, and fourth corner regions include a point where a tangent extending in a first direction among tangents of the uppermost point of the pixel array, a tangent extending in the first direction among tangents of the lowest point of the pixel array, a tangent extending in the second direction orthogonal to the first direction among tangents of the leftmost point of the pixel array, and a tangent extending in the second direction among tangents of the rightmost point of the pixel array intersect, and wherein the plurality of second display pixels and the plurality of image sensing pixels are disposed only in an area overlapping the first, second, third, and fourth corner regions and the second region.

7. The display device of claim 6, wherein the first corner region is disposed below an eye of the user as a reference, wherein the driving circuit applies a driving signal only to a row line connected to image sensing pixels disposed in the first corner region among the plurality of image sensing pixels, and wherein the image sensing pixels disposed in the first corner region generate pixel signals corresponding to the user's gaze in a first portion of the eye of the user.

8. The display device of claim 1, wherein the second region comprises an upper region disposed higher than the first region and a lower region disposed lower than the first region, and wherein the plurality of second display pixels and the plurality of image sensing pixels disposed in the second region are disposed only in the upper region and the lower region of the second region.

9. The display device of claim 1, wherein the driving circuit is configured to apply a driving signal to every other row line among a plurality of row lines connected to the plurality of image sensing pixels.

10. The display device of claim 1, wherein the driving circuit is configured to receive a pixel signal from every other column line among a plurality of column lines connected to the plurality of image sensing pixels.

11. The display device of claim 1, wherein the second region further comprises a light emitting pixel that is configured to generate light directed to an eye of the user during operation of the display device.

12. A display panel comprising:

a plurality of display pixels disposed with a first resolution in a first region of a substrate, disposed with a second resolution that is lower than the first resolution in a second region of the substrate, the second region of the substrate surrounding the first region, wherein the plurality of display pixels are configured to emit light during a first period;

a light emitting pixel that is disposed in the second region and is configured to emit light during a second period, which is different from the first period;

a plurality of image sensing pixels disposed in the second region, wherein the plurality of image sensing pixels are configured to emit a pixel signal in response to light being emitted from the light emitting pixel and reflected by a user into the plurality of image sensing pixels; and a plurality of gate lines, wherein at least one image sensing pixel and at least one display pixel are configured to be driven by a same gate line of the plurality of gate lines.

13. The display panel of claim 12, further comprising:

a first circuit is configured to generate a plurality of data signals corresponding to the plurality of display pixels based on input image data, and provide the plurality of data signals to the plurality of display pixels during the first period; and a second circuit is configured to receive a pixel signal from the plurality of image sensing pixels during the second period and generate image data based on the pixel signal.

14. The display panel of claim 13, wherein the first circuit comprises a digital-to-analog converter that is configured to generate an input signal based on the input image data, and wherein the second circuit comprises an analog-to-digital converter that is configured to convert the pixel signal to a pixel value, respectively.

15. The display panel of claim 14, further comprising:

a source line that is connected to a corresponding display pixel among the plurality of display pixels and is configured to receive a corresponding data signal among the plurality of data signals from the first circuit; and a column line that is connected to a corresponding image sensing pixel among the plurality of image sensing pixels, wherein the column line is configured to provide the pixel signal to the second circuit, wherein the first circuit further comprises a first switch that is turned on during the first period and turned off during the second period, and the second circuit further comprises a second switch that is turned off during the first period and turned on during the second period, and wherein the second switch connects the analog-to-digital converter to the column line during the second period.

16. The display panel of claim 12, further comprising a row driver that is configured to output a plurality of gate signals to a plurality of row lines, wherein the plurality of row lines are connected to the plurality of display pixels and the plurality of image sensing pixels, and wherein the plurality of gate signals having an enable level and a disable level.

17. The display panel of claim 16, wherein the plurality of display pixels and the plurality of image sensing pixels each comprise a first transistor receiving the plurality of gate signals, and wherein the first transistors of the plurality of display pixels and the plurality of image sensing pixels are the same type of transistors.

18. A display system comprising:

a pixel array disposed on a substrate and including a plurality of display pixels that are configured to emit light of an image and a plurality of image sensing pixels that are disposed only in a second region of the substrate at a periphery of a first region of the substrate in which a user's gaze settles for sensing light reflected by an eye of the user;

a driving circuit that provides a plurality of data signals to a plurality of source lines based on input image data and generates eye tracking data corresponding to the eye of the user by receiving a pixel signal from a plurality of column lines connected to the plurality of image sensing pixels, wherein the plurality of source lines are connected to the plurality of display pixels;

a plurality of gate lines coupled to the driving circuit, wherein at least one image sensing pixel and at least one display pixel are configured to be driven by a same gate line of the plurality of gate lines;

a host device that is configured to provide the input image data, receive the eye tracking data, and process the input image data based on the eye tracking data; and a plurality of second display pixels disposed in the second region, wherein the input image data comprises first image data rendered with first resolution and second image data rendered with second resolution, wherein the second resolution is lower than the first resolution, and wherein the driving circuit is configured to generate the plurality of data signals based on the first image data, generate a second plurality of second data signals based on the second image data, and provide the second plurality of second data signals to the plurality of second display pixels.

19. A display system of claim 18, wherein the display system further comprises an optical element that corrects an error related to the light of the input image data, and the plurality of image sensing pixels are configured to sense light reflected to the eye of the user through the optical element.

* * * * *